US009805408B2

(12) United States Patent
Whisnant et al.

(10) Patent No.: US 9,805,408 B2
(45) Date of Patent: Oct. 31, 2017

(54) AUTOMATED CREATION OF COLLAGES FROM A COLLECTION OF ASSETS

(71) Applicant: Dell Products L.P., Round Rock, TX (US)

(72) Inventors: Rodney T. Whisnant, Austin, TX (US); Joseph D. Langeway, Austin, TX (US); Christopher H. Howe, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/891,666

(22) Filed: Jun. 17, 2013

(65) Prior Publication Data
US 2014/0372249 A1 Dec. 18, 2014

(51) Int. Cl.
G06Q 30/06 (2012.01)
G06Q 50/00 (2012.01)
G06Q 30/02 (2012.01)

(52) U.S. Cl.
CPC ..... *G06Q 30/0631* (2013.01); *G06Q 30/0269* (2013.01); *G06Q 50/01* (2013.01)

(58) Field of Classification Search
CPC ............ G06C 30/0631; G06C 30/0643; G06C 30/0641; G06T 11/60
USPC ..................... 705/26.1, 26.7, 27.1
See application file for complete search history.

(56) References Cited

U.S. PATENT DOCUMENTS

| 6,321,221 | B1 | 11/2001 | Bieganski |
| 7,647,309 | B1 | 1/2010 | Bar |
| 7,689,432 | B2 | 3/2010 | Gross |
| 7,818,399 | B1 | 10/2010 | Ross, Jr. et al. |
| 8,244,848 | B1 | 8/2012 | Narayanan et al. |
| 8,543,457 | B2 | 9/2013 | Staib et al. |
| 8,667,064 | B2 | 3/2014 | Zuckerberg et al. |
| 8,898,139 | B1 * | 11/2014 | Philbin ............. G06F 17/30153 707/711 |
| 8,935,604 | B2 | 1/2015 | DeHaven et al. |
| 2002/0010625 | A1 | 1/2002 | Smith et al. |
| 2005/0044485 | A1 * | 2/2005 | Mondry ................. G06T 11/60 715/247 |
| 2005/0204276 | A1 | 9/2005 | Hosea et al. |

(Continued)

OTHER PUBLICATIONS

M. Matheny, Pinterest Tips—A Tutorial Guide for Beginners, The Yummy Life, http://www.theyummylife.com/Pinterest_tips.

(Continued)

*Primary Examiner* — Mila Airapetian
(74) *Attorney, Agent, or Firm* — Terrile, Cannatti, Chambers & Holland, LLP; Stephen A. Terrile

(57) ABSTRACT

A system and method are disclosed for automating the provision of social media product recommendations in an electronic commerce environment. A user selects one or more products from one or more Pick Lists, which are a pictorial grouping of products that the user has selected, assembled and named. The user then selects a Pick Collage template, which is then populated with the selected product(s). Once populated, the Pick Collage template is processed to generate a Pick Collage, which provides a more stylized presentation of the selected product(s). Once generated, the Pick Collage is provided to a website associated with a merchant that provides the selected product(s).

20 Claims, 32 Drawing Sheets

(56) References Cited

U.S. PATENT DOCUMENTS

| | | |
|---|---|---|
| 2007/0033532 A1 | 2/2007 | Lemelson |
| 2008/0133724 A1 | 6/2008 | Clark |
| 2008/0243632 A1 | 10/2008 | Kane et al. |
| 2008/0281834 A1 | 11/2008 | Wu et al. |
| 2008/0306807 A1 | 12/2008 | Amento et al. |
| 2009/0043674 A1* | 2/2009 | Minsky et al. ............... 705/27 |
| 2009/0265251 A1 | 10/2009 | Dunlap et al. |
| 2009/0299981 A1 | 12/2009 | Nagasaka et al. |
| 2010/0030578 A1 | 2/2010 | Siddique et al. |
| 2010/0131384 A1 | 5/2010 | Chen et al. |
| 2010/0191582 A1 | 7/2010 | Dicker et al. |
| 2010/0321405 A1* | 12/2010 | MacInnes et al. ............ 345/635 |
| 2011/0066497 A1 | 3/2011 | Gopinath et al. |
| 2011/0093361 A1 | 4/2011 | Morales |
| 2011/0099523 A1* | 4/2011 | van Zee et al. ............. 715/838 |
| 2011/0202400 A1 | 8/2011 | Bedard et al. |
| 2011/0252343 A1 | 10/2011 | Broman et al. |
| 2011/0264736 A1 | 10/2011 | Zuckerberg et al. |
| 2011/0320276 A1 | 12/2011 | Ray et al. |
| 2012/0311623 A1 | 12/2012 | Davis et al. |
| 2013/0067585 A1 | 3/2013 | Sterland et al. |
| 2013/0191372 A1 | 7/2013 | Lee et al. |
| 2013/0219520 A1 | 8/2013 | Atkinson et al. |
| 2013/0260727 A1 | 10/2013 | Knudson et al. |
| 2013/0290110 A1 | 10/2013 | LuVogt et al. |
| 2014/0089135 A1 | 3/2014 | Linh et al. |
| 2014/0095463 A1 | 4/2014 | Pappas |
| 2014/0149259 A1 | 5/2014 | Grace et al. |
| 2014/0164401 A1 | 6/2014 | Kyaw et al. |
| 2014/0207609 A1 | 7/2014 | Earhart et al. |
| 2014/0258063 A1 | 9/2014 | Chourasia et al. |
| 2014/0279197 A1 | 9/2014 | Ainsworth, III et al. |
| 2014/0280054 A1* | 9/2014 | Karunakaran .... G06F 17/30991 707/722 |
| 2014/0307980 A1* | 10/2014 | Hilt .................... G06T 11/60 382/284 |

OTHER PUBLICATIONS

Anonymous, Display Ad 13—No Title, Apr. 10, 1894, New York Times (1857-1922).

* cited by examiner

Figure 10b

AUTOMATED CREATION OF COLLAGES FROM A COLLECTION OF ASSETS

CROSS REFERENCE TO RELATED APPLICATIONS

U.S. patent application Ser. No. 13/891,649, entitled "On-Site Curation That Enables Scalable Peer Generated Content that is Visual and Inspires Discovery Anywhere" by inventors Christopher H. Howe, Joseph D. Langeway, Manish C. Mehta, and Rodney T. Whisnant, filed on May 10, 2013, describes exemplary methods and systems and is incorporated by reference in its entirety.

U.S. patent application Ser. No. 13/891,684, entitled "Process To Display Picks On Product Category Pages" by inventors Rodney T. Whisnant, Joseph D. Langeway, and Christopher H. Howe, filed on May 10, 2013, describes exemplary methods and systems and is incorporated by reference in its entirety.

U.S. patent application Ser. No. 13/891,698, entitled "Forward Looking Recommendations Using Information Derived from a Plurality of Picks Generated by a Plurality of Users" by inventor Rodney T. Whisnant, filed on May 10, 2013, describes exemplary methods and systems and is incorporated by reference in its entirety.

U.S. patent application Ser. No. 13/891,710, entitled "Picks API Which Facilitates Dynamically Injecting Content onto a Web Page for Search Engines," by inventor Rodney T. Whisnant, filed on May 10, 2013, describes exemplary methods and systems and is incorporated by reference in its entirety.

U.S. patent application Ser. No. 13/891,721, entitled "Mobile Application Enabling Product Discovery and Obtaining Feedback from Network" by inventors Henry Haitian Chen and Manish C. Mehta, filed on May 10, 2013, describes exemplary methods and systems and is incorporated by reference in its entirety.

BACKGROUND OF THE INVENTION

Field of the Invention

The present invention relates to the management of information handling systems. More specifically, embodiments of the invention provide a system and method for automating the provision of social media product recommendations in an electronic commerce environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet.

One emerging aspect of electronic commerce is for users to use social media sites as a venue to review or recommend various products. Such reviews or recommendations may be provided in a variety of ways, including simple online forum or social media posts, to blog entries, video clips, and even dedicated websites. In some cases, the reviewer may provide a link to either a merchant's website, or a product details page, for the product they are reviewing or recommending. In other cases, a merchant may provide a link on their product details page to a reviewer or recommender.

However, such approaches typically require the viewer of the product reviews or recommendations to leave the social media site to visit the merchant's website or product details pages. Conversely, viewers of a merchant's product details pages may be required to leave to the merchant's website to view the reviews or recommendations of the product they were considering. Furthermore, the reviewer or recommender of the products may face challenges in creating a visually appealing layout to display the products that correspond to their reviews or recommendations.

SUMMARY OF THE INVENTION

A system and method are disclosed for automating the provision of social media product recommendations in an electronic commerce environment. In various embodiments, a user selects one or more products from one or more Pick Lists, which are a pictorial grouping of products that the user has selected, assembled and named. The user then selects a Pick Collage template, which is then populated with the selected product(s). Once populated, the Pick Collage template is processed to generate a Pick Collage, which provides a more stylized presentation of the selected product(s).

Once generated, the Pick Collage is provided to a website associated with a merchant that provides the selected product(s). In certain embodiments, a Pick System user is able to select from a plurality of Pick Collage templates, each of which includes various design parameters, such as a visual layout, a background image, a color palette, and a typeface. In various embodiments, the user is provided editing capabilities to edit the Pick Collage, such as adding or removing products. In these embodiments, the user is also provided the ability to assign a name to the Pick Collage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 10a and 10b show the display of product details and associated user reviews and recommendations within a UI window;

DETAILED DESCRIPTION

A system and method are disclosed for automating the provision of social media product recommendations in an electronic commerce environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
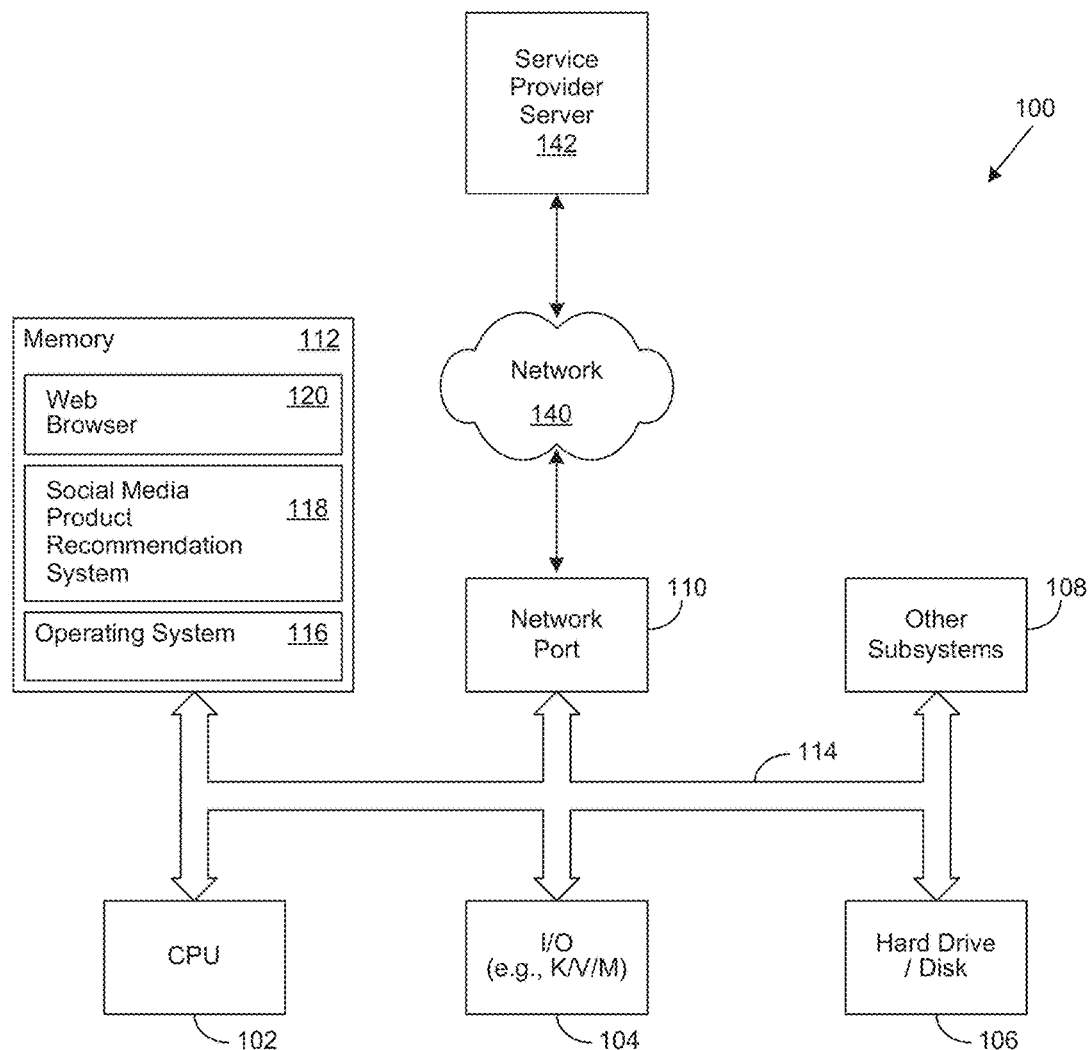
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social media recommendation system 118 and a web browser 120. In one embodiment, the information handling system 100 is able to download the social media recommendation system 118 from the service provider server 142. In another embodiment, the social media recommendation system 118 is provided as a service from the service provider server 142.

Figure 2:
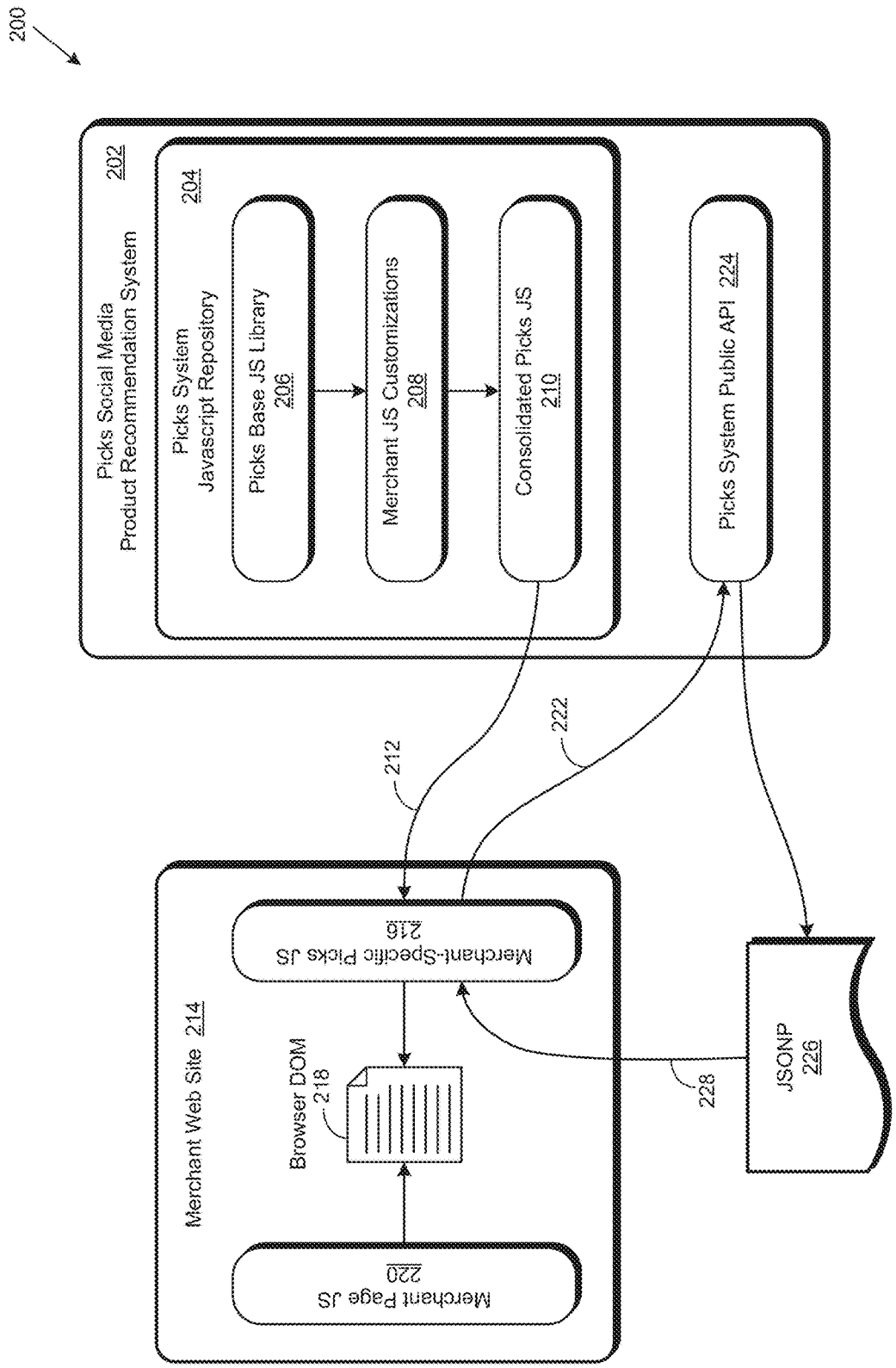
FIG. 2 is a simplified block diagram showing the implementation of a social media product recommendation system in an electronic commerce environment.

FIG. 2 is a simplified block diagram showing a social media product recommendation system 202 implemented in accordance with an embodiment of the invention in an electronic commerce environment 200. In various embodiments, the social media product recommendation system 202, referred to herein as a "Picks System," is implemented to allow users to create and manage collections of their favorite products. These product collections, variously referred to herein as a "Pick List," a "Pick Collage," or "Picks," can then be automatically published and displayed on related product details pages 214 in a merchant's website. In various embodiments, the Pick List, Pick Collage, or Picks are provided to the merchant's website from a server at a remote location. In certain embodiments, the Pick List, Pick Collage, or Picks are provided to the merchant's website by a service provider on an on-demand basis.

In various embodiments, visitors to these product details pages 214 can shop directly from a Pick List, share a Pick List through social media networks, or build a long-term social connection with the creator of a Pick List by "following" them. In certain of these embodiments, the visitors are likewise able to use such social media networks to "like" predetermined Pick Lists, Pick Collages, or Picks. As used herein, in the context of social media environments, the term "like" refers to the user expressing that he or she likes, enjoys or supports certain content.

As used herein, a "Pick List" refers to a pictorial grouping of products that a user has selected, assembled and named. In various embodiments, the data associated with a Pick List is managed by the Picks System 202 as described in greater detail herein. As used herein, a Pick Collage refers to a set of products that a user has selected from one or more Pick Lists, which are then pictorially arranged by the user for use as a background image within a user interface window of a display device. In certain embodiments, a Pick Collage may include a product that is not a member of a Pick List associated with the Pick System user. As used herein, a "Pick Set" refers to a grouping of two or more Pick Lists.

As used herein, a "Pick List preview" refers to the display of a predetermined number of products that were most recently added to one or more target Pick Lists. In one embodiment the predetermined number of products is determined by the Picks System user. In another embodiment, the predetermined number of products is determined by an administrator of the merchant's website. In yet another embodiment, the predetermined number or products is different for various pages within the merchant's website. In still another embodiment, the one or more target Pick Lists are selected by the Picks System user. In one embodiment, the one or more target Pick Lists are a predetermined number of Pick Lists that a Picks System user has most recently interacted with.

As used herein, a "Picks Collage detail page" refers to the display of product details contained in a selected Pick Collage. In various embodiments, the Picks Collage detail page provides predetermined functionalities. As used herein, an "anonymous user" refers to a user who either does not have a client login identifier or a user that has a client login identifier but is not presently logged-in to the Picks System.

In various embodiments, the Picks System 202 is implemented to reduce the effort required for a merchant to integrate the functionality of the Picks System 202 within their website. In various embodiments, software customization tasks are performed either by an operator of the Picks System 202 or a third party integration team. Another aspect is that these third parties are able to maintain and enhance the feature set provided to the merchant without requiring the merchant to perform any additional integration or software upgrade tasks once the basic integration has been established.

In various embodiments, these objectives are achieved, in part, by integrating Picks System functionality into the merchant's website by including a merchant-specific script code file, such as a Picks Javascript (JS) file 216 in predetermined pages, such as product details pages, of the merchant's website 214. In various embodiments, the merchant-specific Picks JS file 216 is dynamically assembled. As a result, the merchant-specific Picks JS file 216 has the ability to change, capture data, and inject information into the merchant's website in various ways. This dynamic JS approach, coupled with content injection into a web page, is implemented in various embodiments as a "broadcast" paradigm depicted in FIG. 2.

In various embodiments, a consolidated script code file, such as the consolidated Picks JS file 210 included in a merchant's web page is dynamically assembled at runtime by combining a general script code base library, such as the general Picks System base JS library 206, with a series of script code customizations, such as JS customizations 208, that are generated to support merchant-specific aspects of the integration. In various embodiments, the Picks System base JS library 206, the merchant JS customizations 208, and the consolidated Picks JS file 210 are stored and maintained in a Picks System JS repository 204. In various embodiments, the resulting consolidated Picks JS file 210 is implemented and maintained 212 as a merchant-specific Picks JS file 216 in the merchant's website 214. In various embodiments, the consolidated Picks JS file 210 is implemented and maintained 212 as a merchant-specific Picks JS file 216 either by the owner or an operator of the merchant's website 214, the operator of the Picks System 202, or a third party.

In various embodiments, the merchant-specific Picks JS file 216 is implemented to make dynamic HTTP requests 222 to the Picks System 202 to record or retrieve additional information through a Picks System Public Application Programming Interface (API) 224. In certain of these embodiments, the Picks System 202 provides a response 228 to the requests with predetermined data. In at least one embodiment, JS Object Notation with Padding (JSONP) 226 is used to perform the response. In one embodiment, this data is used in a target page of the merchant's website 214. In another embodiment, the data is used to trigger additional types of requests back to the Picks System 202. In various embodiments, the data is formatted and dynamically into the target page of the merchant's website 214 as it is received from the Picks System 202 by manipulating the browser's Document Object Model (DOM) 218. In one embodiment, changes to the merchant page JS 220 are kept in sync with the merchant JS customizations 208.

Figure 3:
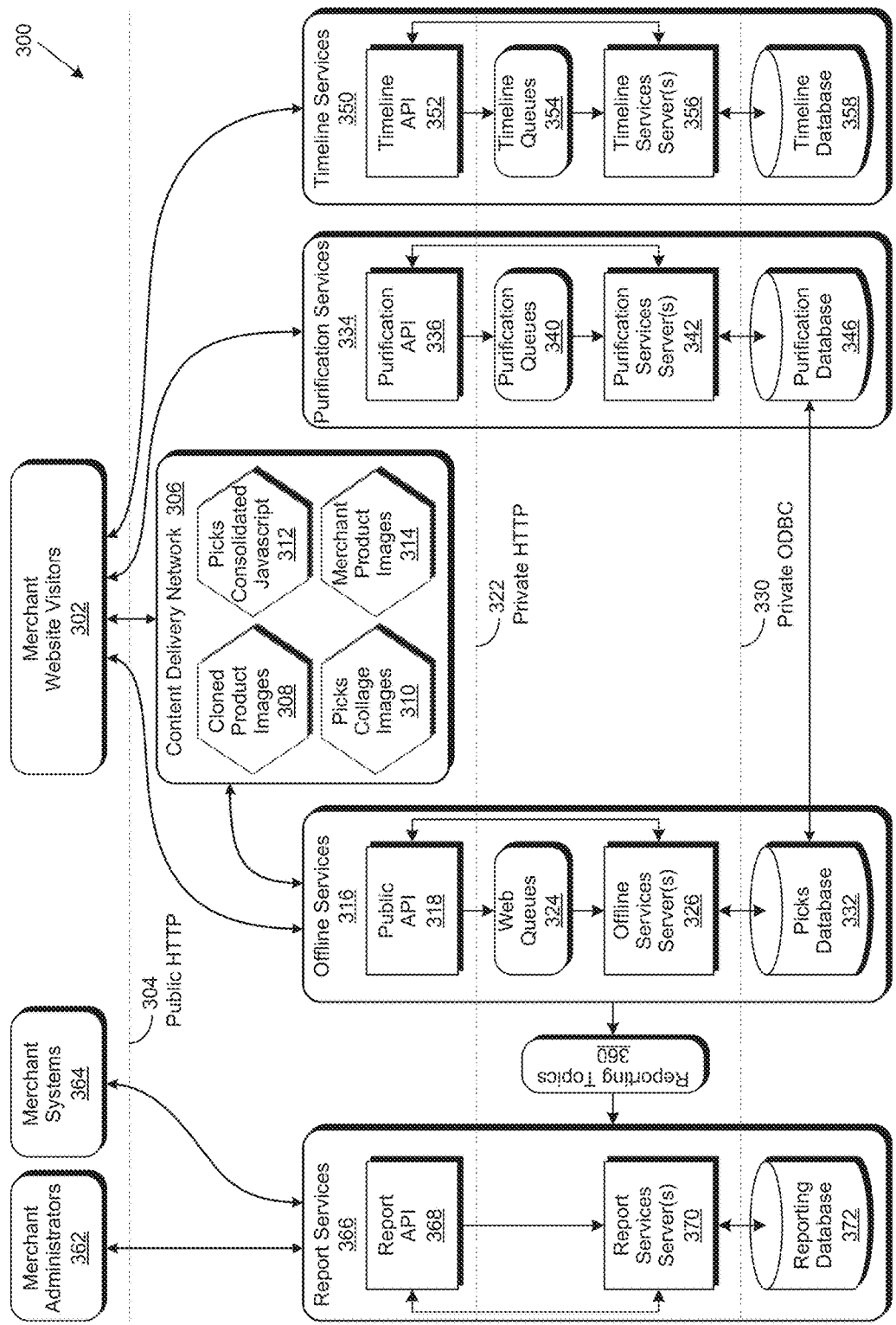
FIG. 3 is a simplified block diagram showing a high-level architecture of a social media product recommendation system.

FIG. 3 is a simplified block diagram showing a high-level architecture of a social media product recommendation system 300 implemented in accordance with an embodiment of the invention. In various embodiments, the social media product recommendation system 300, referred to herein as a "Picks System," is implemented in a cloud computing environment familiar to skilled practitioners of the art. In this embodiment, the Picks System 300 includes a content delivery network (CDN) 306, an offline services system 316, a purification services system 334, a timeline services system 350, and a report services system 366. As shown in FIG. 3, visitors to a merchant's website 302 are also able to access the CDN 306, the offline services system 316, the purification services system 334, and the timeline services system 350 through a public Hypertext Transfer Protocol (HTTP) 304 environment, such as the public Internet. As also shown in FIG. 3, the merchant's website administrators 362, and associated merchant systems 364, are likewise able to access the report services system 366 through the public HTTP environment 304.

In various embodiments, the offline services system 316, the purification services system 334, the timeline services system 350, and report services system 366 respectively include a public Application Program Interface (API) 318, a purification API 336, a timeline API 352, and a report API 368. In various embodiments, the public API 318, the purification API 336, and the timeline API 352 manage HTTP requests originating from browsers used by visitors to a merchant's website 302 that has implemented merchant-specific Picks Javascript (JS) files that are described in greater detail herein. In various embodiments, the public API 318 also manages HTTP requests from the content delivery network 306. In various embodiments, the report API 352 manages HTTP requests from the merchant's website administrators 362 and associated merchant systems 364.

In various embodiments, the content served by the Picks System 300 to the public HTTP environment is the same, or changes infrequently, regardless of which user is accessing the content. In certain of these embodiments, this content is cached in, and served from, a CDN 306, such as the CloudFront® CDN 306 provided by Amazon® Web Services (AWS) to reduce delivery latency. In various embodiments, the CDN 306 includes cloned product images 308, Pick Collage images 310, consolidated Picks JS 312, and merchant product images 314. As used herein, a cloned product image 308 refers to a duplicated client product image 314. In one embodiment, a merchant product image 314 is resized to generate a cloned product image 302.

In one embodiment, a request is received for a cloned product image 308, a Pick Collage image 310, consolidated Picks JS 312, or a merchant product image 314 that is not currently present in the CDN 306. In this embodiment, the CDN 306 submits a request to the public API 318 to dynamically build and retrieve the requested content. In one embodiment, a request is received for a merchant product image 314. In this embodiment, the public API 318 will in turn submit a request to the merchant's website to retrieve the image and then save it in the CDN 306 for subsequent use.

In various embodiments, the purification services system 334 is implemented to perform purification services on content submitted by Picks System users to ensure that inappropriate content (e.g., profanity, derogatory comments, etc.) is not presented in the merchant's website. As shown in FIG. 3, the purification services system 334 includes a purification API 336, which submits requests for purification services to one or more purification queues 340, which in turn manage submission of the purification service requests to one or more purification services servers 342. The one or more purification services servers 356 then use purification data stored in the purification database 346 to perform purification services on content stored in the Picks database 332.

As likewise shown in FIG. 3, the timeline services system 350 includes a timeline API 352, which submits requests for timeline information to one or more time queues 354, which in turn manage submission of the timeline information requests to one or more timeline services servers 356. The one or more timeline services servers 356 then process timeline data stored in the timeline database 358 to generate a timeline information response, which in turn is provided to the timeline API 352.

In various embodiments, the timeline services system 350 is implemented physically and logically separate from other components of the Picks System 300 to offset the computationally intensive effects of generating and providing timeline information. In certain of these embodiments, timeline services are exposed in a traditional HTTP manner, similar to the public API 318. However, the timeline services are not accessed through the public HTTP environment 304 in these embodiments. Instead, when a timeline information request is received by the public API 318, it makes a private HTTP request 322 to the timeline services system 350 to either request or record timeline information.

In various embodiments, the offline services system 316 is implemented to perform Picks System 300 processes associated with services that do not need to be provided in real-time. In certain of these embodiments, the Picks System 300 services are provided asynchronously. Examples of such processes include the calculation of timeline data or aggregation of reporting statistics.

As shown in FIG. 3, the offline services system 316 includes a public API 318, which submits requests for offline services to one or more web queues 324, which in turn manage submission of the offline service requests to one or more offline services servers 326. The one or more offline services servers 326 then processes various data elements stored in the Picks database 332 to generate an offline services response, which in turn is provided to the public API 318.

In various embodiments, a report services system 366 is implemented to allow merchant administrators 362 and merchant systems 364 to access various information related to data that the Picks System 300 collects. Examples of such data include the top Pick Lists associated with the merchant's website, most popular products, most-liked users, etc. As shown in FIG. 3, the report services system 366 includes a report API 368, which submits requests for report services to one or more report services servers 370. The one or more report services servers 370 then processes various data elements stored in the reporting database 372 to generate a report services response, which in turn is provided to the report API 368.

In one embodiment, the report API 368 provides merchant website administrators 362 a public HTTP 304 interface, which can be used with their browsers to browse information stored in the reporting database 372. In another embodiment, the report API 368 provides merchant systems 364, such as business intelligence systems or data warehouses, a public HTTP 304 interface to dynamically submit report services requests to the report services servers 370. In various embodiments, the offline services system 316 provides various Picks System 300 data in the form of reporting topics 360 via a private HTTP interface to the report services system 366.

In various embodiments, Picks System 300 data, with the exception of merchant product images 314, is stored in the Picks database 332, the timeline database 358, and the reporting database 372, which are implemented in a private Open Database Connectivity (ODBC) environment 330. In certain embodiments, the Picks database 332 includes merchant configuration details, registered user records, Pick Lists, and Pick Collages. In various embodiments, server-based scraping is implemented to mitigate potential issues with inappropriate content being injected into the Picks System 300, and by extension, the Picks database 332, by malicious users.

In various embodiments, a database sharding approach is implemented for large data sets stored in the Picks database 332. As used herein, a database shard is a horizontal partition in a database or search engine. Each individual partition is referred to as a shard or database shard. Horizontal partitioning is a database design principle whereby rows of a database table are held separately, rather than being split into columns. Each partition forms part of a shard, which may in turn be located on a separate database server or physical location. In at least one embodiment, the Picks Database 332 is implemented using a NoSQL database.

Figure 4:
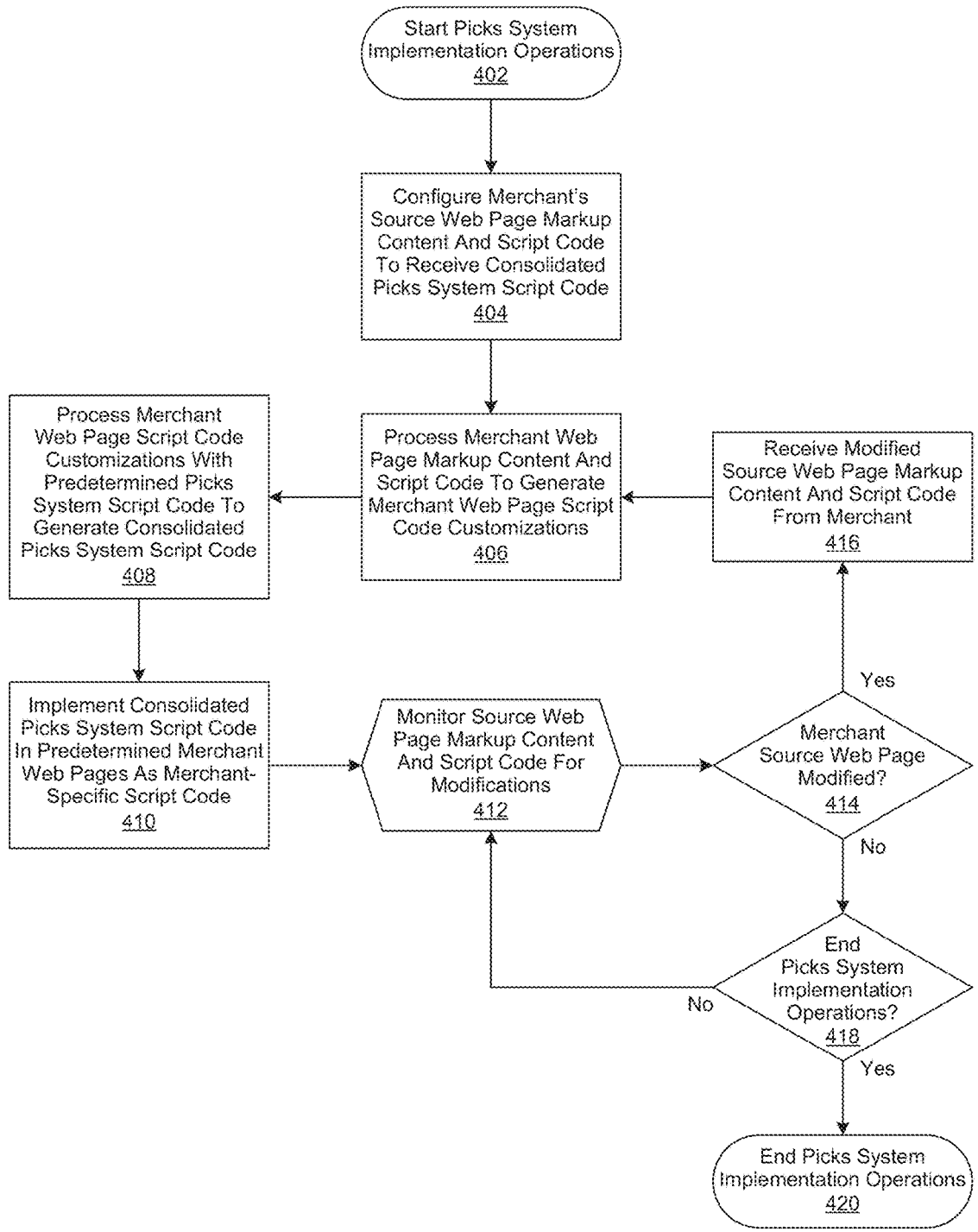
FIG. 4 is a generalized flowchart of the implementation of a social media product recommendation system in an electronic commerce environment.

FIG. 4 is a generalized flowchart of the implementation of a social media product recommendation system in accordance with an embodiment of the invention in an electronic commerce environment. In this embodiment, operations to implement a social media product recommendation system, herein referred to as a "Picks System," are begun in step 402, followed by configuring a merchant's source web page markup content and script code to receive consolidated Picks System script code in step 404. In various embodiments, the source web page markup content includes Hypertext Markup Language (HTML) content. In various embodiments, the source script code includes Javascript (JS) code.

Then, in step 406, the merchant's source web page markup content and script code are processed to generate merchant web page script code customizations. The resulting merchant web page script code customizations are then processed in step 408 with predetermined Picks System script code to generate consolidated Picks System script code. The resulting consolidated Picks System script code is then implemented in predetermined merchant web pages as merchant-specific script code in step 410.

The merchant's source web page markup content and script code is then monitored in step 412 for the occurrence of modifications, followed by a determination being made in step 414 whether any modifications have occurred. If so, then the modified web page markup content and script code is received from the merchant's web site in step 416 and the process is continued, proceeding with step 406. Otherwise, a determination is made in step 418 whether to end Picks System implementation operations. If not, then the process is continued, proceeding with step 412. Otherwise, Picks System implementation operations are ended in step 420.

Figure 5A:
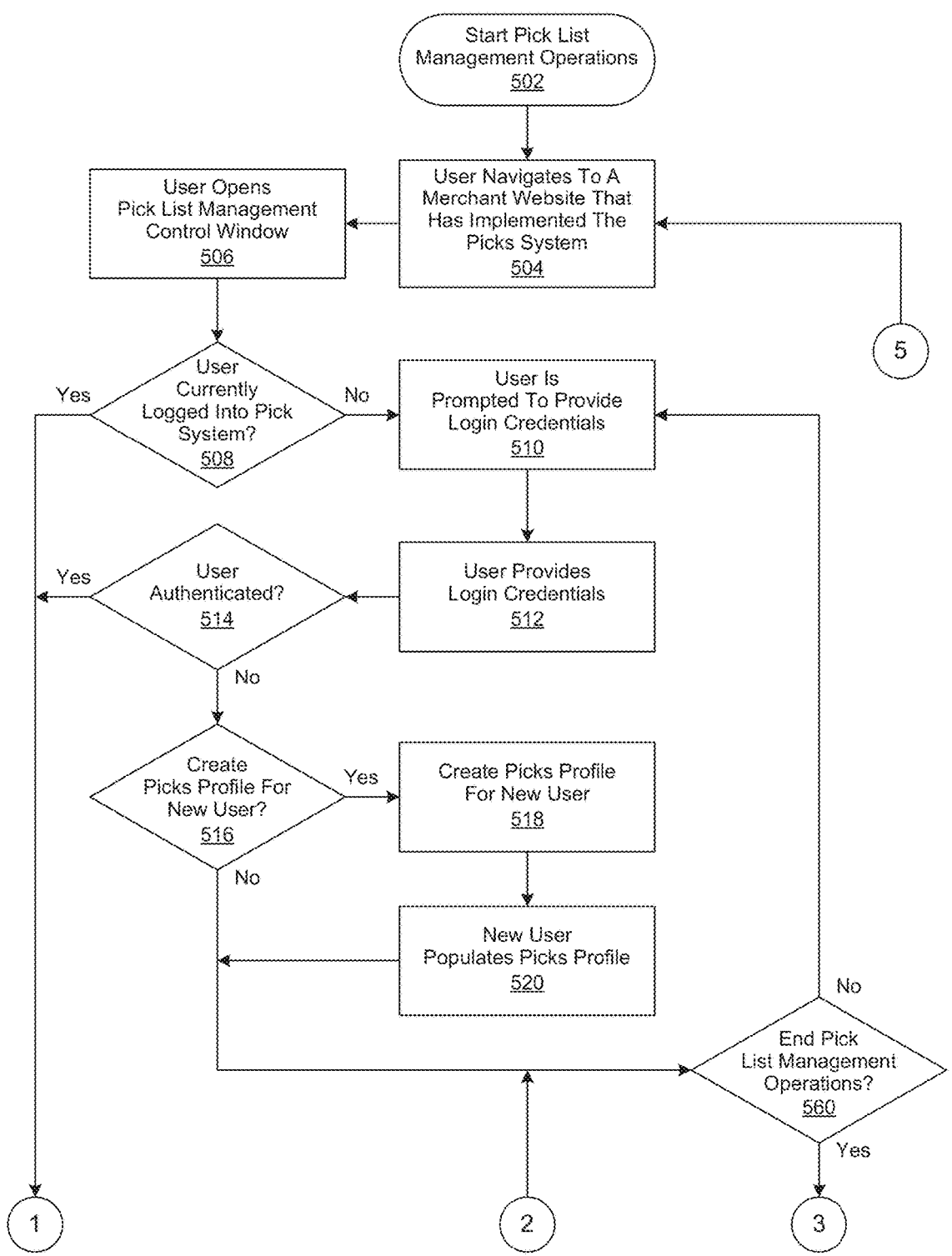
FIGS. 5a through 5c are a generalized flowchart of the performance of Pick List management operations in an electronic commerce environment.
Figure 5B:
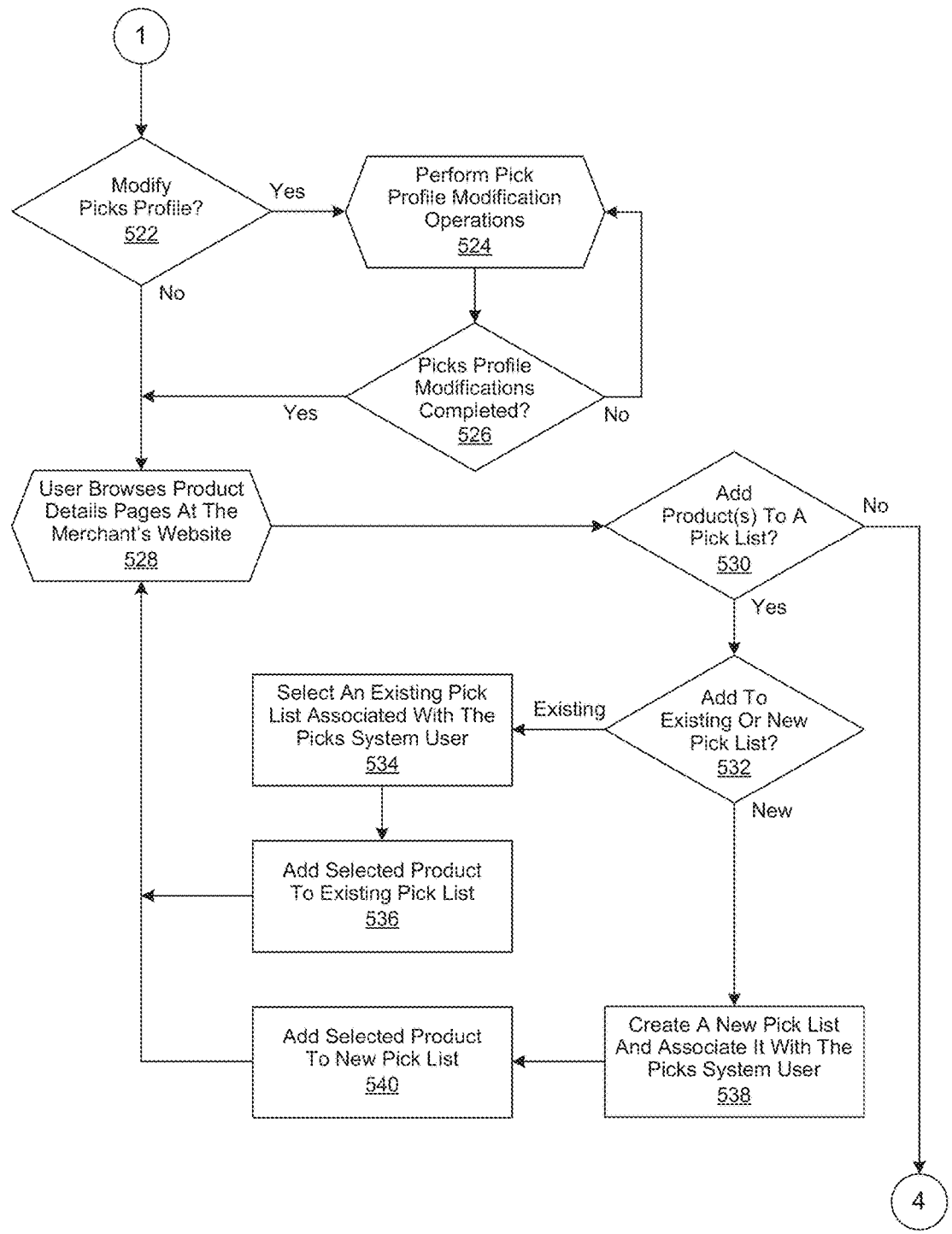
Figure 5C:
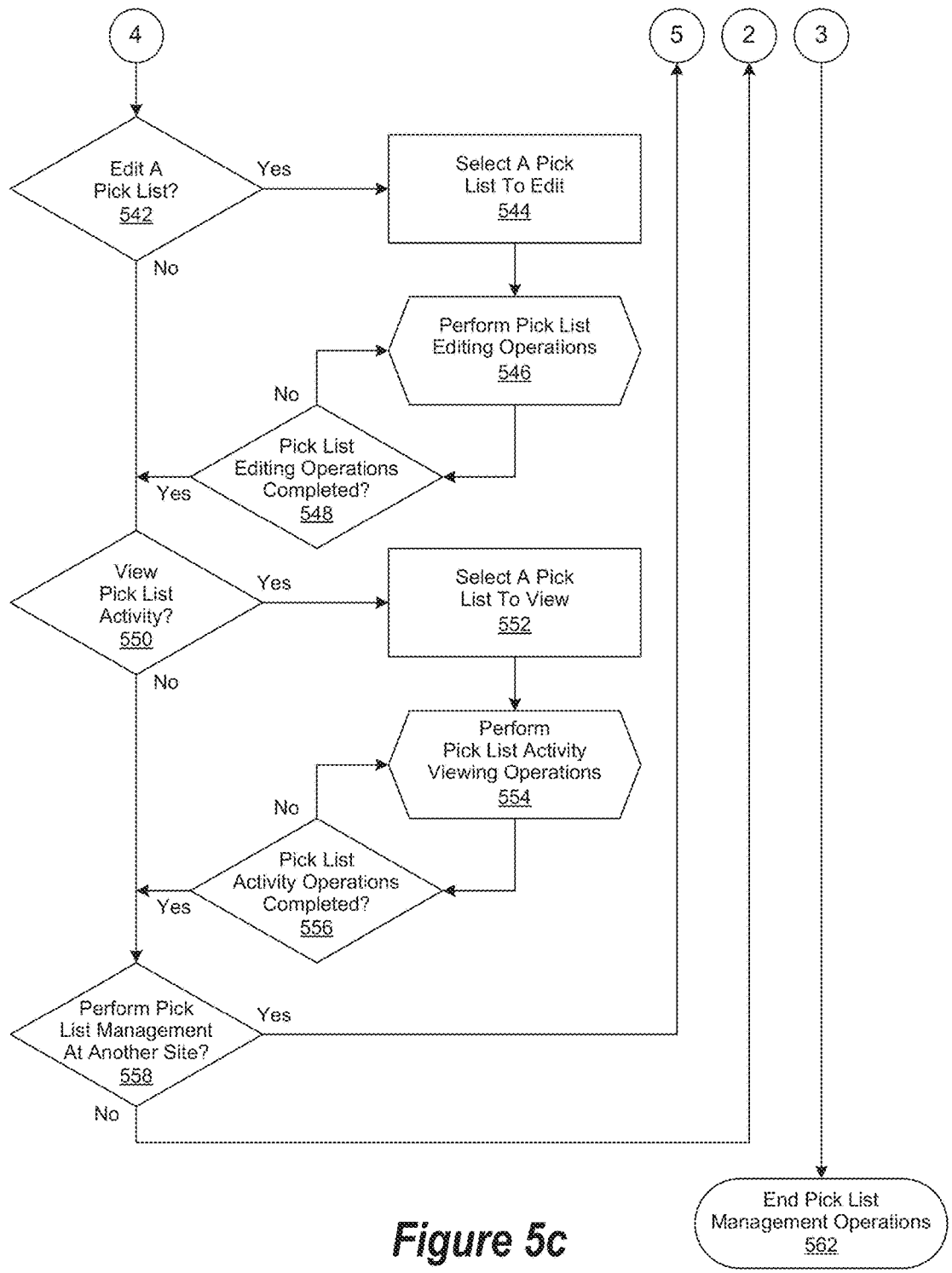

FIGS. 5a through 5c are a generalized flowchart of Pick List management operations performed in accordance with an embodiment of the invention in an electronic commerce environment. In this embodiment, Pick List management operations are begun in step 502, followed by a user navigating in step 504 to a merchant's web site that has implemented the Picks System. Then, in step 506, the user opens a Pick List management control window.

A determination is then made in step 508 whether the user is currently logged into the Picks System. In one embodiment, the user logs into the Picks System at each merchant's website. In another embodiment, Picks System is implemented to support universal login. In this embodiment, the user initially logs into the Picks System at a first merchant's website. Thereafter, they are automatically logged into the Picks System at other merchant's websites.

If it was determined in step 508 that the user not logged into the Picks System, then the user is prompted in step 510 to provide login credentials, which are then provided in step 512. A determination is then made in step 514 whether the user has been authenticated by the provided login credentials. If not, a determination is made in step 516 whether to create a Picks user profile for the user. If so, then a Picks user profile is created for the new user, who then populates the newly-created Picks user profile with associated user account information in step 520.

Once the new Picks System user populates their Picks user profile in step 520, or if it was determined in step 516 not to create a Picks user profile for a new user, a determination is made in step 560 whether to end Pick List management operations. If not, then the process is continued, proceeding with step 510. Otherwise, Pick List management operations are ended in step 562.

However, if it was determined in step 508 that the user was currently logged into the Picks System, or if it was determined in step 514 that the user was authenticated, then a determination is made in step 522 whether the user's Picks user profile is to be modified. If so, then Picks user profile modifications are performed in step 524. A determination is then made in step 526 whether modification operations to the user's Picks user profile have been completed. If not, then the process is continued, proceeding with step 524. Otherwise, or if it was determined in step 522 that the user's Picks user profile was not to be modified, then the user browses product details pages at the merchant's website in step 528.

A determination is then made in step 530 whether one or more products displayed on a product details page is to be added to a Pick List by the Picks System user. If so, then a determination is made in step 532 whether the one or more products is to be added to an existing or a new Pick List. If it is determined in step 532 that the one or more selected products is to be added to an existing Pick List associated with the Picks System user, then the existing Pick List is selected by the Picks System user in step 534. The one or more selected products are then added to the selected Pick List in step 536. However, if it is determined in step 532 to add the one or more selected products to a new Pick List, then a new Pick List is created and associated with the Picks System user in step 538. The one or more selected products are then added to the newly-created Pick List in step 540. Once the one or more selected products are respectively added to the existing or newly-created Pick Lists in steps 536 or 540, the process is continued, proceeding with step 528.

However, if it was determined in step 530 not to add one or more products to a Pick List, then a determination is made in step 542 whether to edit a Pick List. If so, then a Pick List is selected in step 544 to edit. Pick List editing operations are then performed on the selected Pick List in step 546. Once Pick List editing operations are performed in step 546, a determination is made in step 546 whether Pick List editing operations are completed. If not, then the process is continued, proceeding with step 543. Otherwise, or if it was determined in step 542 not to edit a Pick List, a determination is made in step 550 whether to view Pick List activity. If so, then a Pick List to view is selected in step 552, followed by the performance if Pick List activity viewing operations in step 554.

Once Pick List activity viewing operations have been performed in step 554, a determination is made in step 556 whether Picks List activity viewing operations have been completed. If not, then the process is continued, proceeding with step 554. Otherwise, or if it was determined in step 550 not to view Pick List activity, a determination is made in step 558 whether to continue Pick List management operations at another merchant's web site. If so, then the process is continued, proceeding with step 504. Otherwise, the process is continued, proceeding with step 560.

Figure 6A:
FIGS. 6a and 6b show the display of user's Picks user profile within a user interface (UI) window.
Figure 6B:
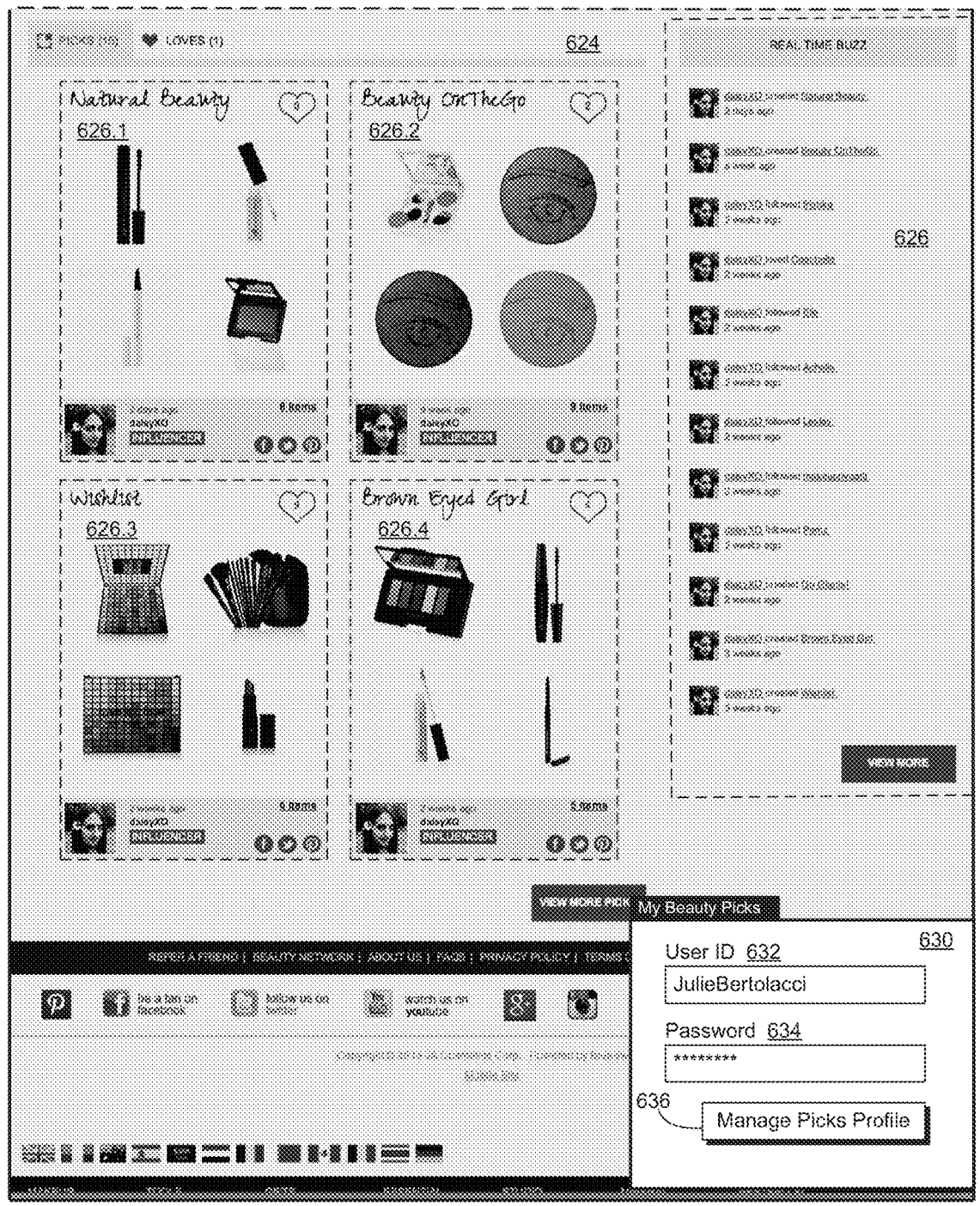

FIGS. 6a and 6b show the display of user's Picks user profile within a Picks user profile user interface (UI) window implemented in accordance with an embodiment of the invention. In various embodiments, a Picks System user navigates to a merchant's web site that has implemented the Picks System to manage their Picks user profile 604. As used herein, a Picks user profile 604 refers to the combination of Picks System user account information and associated Picks data. In various embodiments, the data in a Picks user profile 604 may include the Pick System user's login credentials 632, 634, their Picks screen name 606 or Picks avatar 608, associated user information 610, Pick Lists 626.1, 626.2, 626.3, 626.4 and Pick Collages they have created, and their "likes" and "favorites" 612. As used herein, a "Picks screen name" 606 refers to a user identifier associated with a user of the Picks System. In certain embodiments, the user is unable to create and manage their Pick Lists 626.1, 626.2, 626.3, 626.4 and Pick Collages until an associated Picks user profile 604 has been created.

If the user is not currently logged into the Picks System, then they submit their user credentials for authentication. In certain embodiments, a Picks fly-out UI window 630 is implemented for the submission of user credentials, such as a user identifier (ID) 632 and password 634. As used herein, a Picks fly-out UI window 630 refers to a fly-out window that resides on a merchant's web page, which can be opened and used by a Picks system user for various purposes. In various embodiments, these purposes include being authenticated by the Picks System and managing their associated Pick Lists, Pick Collages, or Picks user profile. In certain of these embodiments, the Picks fly-out UI window 630 is persistently made available to the user as they navigate various pages of the merchant's website. In various embodiments, the Picks System provides standalone user account management and authentication capabilities. In certain embodiments, Picks System user account management and authentication capabilities are integrated into the merchant's website's existing user account and authentication services.

In certain embodiments, the Picks System user can either log into an existing Picks account or create a new one. If the user decides to create a new Picks account, then an associated Picks user profile 604 is created, populated by the user, and then displayed within the Picks user profile UI window 602. Once the Picks System user is authenticated, they can then proceed to manage their Picks user profile by selecting a command button, such as the "Manage Picks user profile" command button 636, with a user gesture.

In various embodiments, the Picks user profile 604 provides the ability for the user to create a "persona" that may include items such as a Picks screen name 606, a profile picture 608 or Picks avatar 608, a geographic location 610, interests 612, and a profile description 610. In certain embodiments, the Picks System user can edit this information by selecting an "Edit" command button 640 through a user gesture, such as a mouse-click with a cursor. In various embodiments, the provided "persona" information becomes the basis of the user's public Picks user profile 604 on the merchant's website.

In various embodiments, Pick Lists 626.1, 626.2, 626.3, 626.4 and Pick Collages are displayed within a Pick Lists sub-window 624. In these embodiments, the Pick Lists 626.1, 626.2, 626.3, 626.4 include a reference to the Picks System user that created them. In certain of these embodiments, a Pick List 626.1, 626.2, 626.3, 626.4 or Pick Collage can be "clicked-through" by viewers who desire additional information associated with their creator. In these embodiments, the creator's Picks user profile 604 is then displayed in the Picks user profile UI window 602. In various embodiments, the Picks user profile 604 contains personalized attributes about the Picks System user to further support the authenticity of the content they have created.

In various embodiments, a Picks System user is provided the ability to upload a Picks user profile image 808 that will be displayed with their Pick Lists 626.1, 626.2, 626.3, 626.4, Pick Collages and Picks user profile 604. In certain embodiments, a Picks System user is provided the ability to import an existing social media (e.g., Facebook®, Twitter®, etc.) profile image as their Picks user profile image 608. In various embodiments, a Picks System user is provided the ability to define a Picks user profile Screen Name 606 that is displayed with their Pick Lists 626.1, 626.2, 626.3, 626.4, Pick Collages, and Picks user profile 604. In certain embodiments, a Picks System user is provided the ability to select predetermined attributes 610, 612 that express their interests, define their location information, and write a brief description about themselves. In various embodiments, a Picks System user is provided the ability to select a predetermined image for their Picks user profile from a list of predefined backgrounds.

In various embodiments, the Pick System is implemented to provide Pick System users the ability to socially share their Picks user profile 604, or another user's Picks user profile to various social media environments 620, such as Facebook®, Twitter® or Pinterest®. For example, the other such users may be "followers" 616 of the Picks System user or users that the Pick System user is "following" 618. In certain embodiments, viewers of another user's Picks user profile have the ability to "follow" that user through the selection of a "Follow" control button 614 through a user gesture, such as a mouse-click. In various embodiments, each Pick System user's Picks user profile 604 displays who the "followers" 616 are of a Pick System user. In certain embodiments, the user's Picks user profile 604 displays who the Picks System user is "following" 618. In certain embodiments, the Picks System is implemented to allow a Picks System user to "click through" a listed follower 616 to access that the follower's associated Pick Lists, Pick Collages, and Picks user profile.

In various embodiments, the Picks System is implemented to provide an ongoing update of Pick List activities, herein referred to as a "Picks Activity Feed" 628, related to the Pick System user. In certain embodiments, the Picks Activity Feed 628 is provided in the form of a "Public View" within the Picks user profile UI window 602. In these embodiments, only predetermined Picks Activity Feed 628 information associated with a Pick System user is displayed to viewers of the user's Picks user profile 604. In one embodiment, the predetermined Picks Activity Feed 628 information only includes Pick List activities that the Picks System user has completed. In various embodiments, the Public View of the Picks Activity Feed 628 provides a list of the Pick Lists that the Picks System user has created. In certain embodiments, the Public View of the Picks Activity Feed 628 provides a list of the Pick Lists that the Picks System user has "liked." In certain embodiments, the Picks Activity Feed 628 is provided in the form of a "Private View." In these embodiments, the Picks Activity Feed information includes activities completed by the user as well as activities associated with other users' Pick Lists, Pick Collages, and Picks user profiles.

Figure 7A:
FIGS. 7a and 7b show a Pick List fly-out user interface window implemented to manage a plurality of Pick Lists.
Figure 7B:
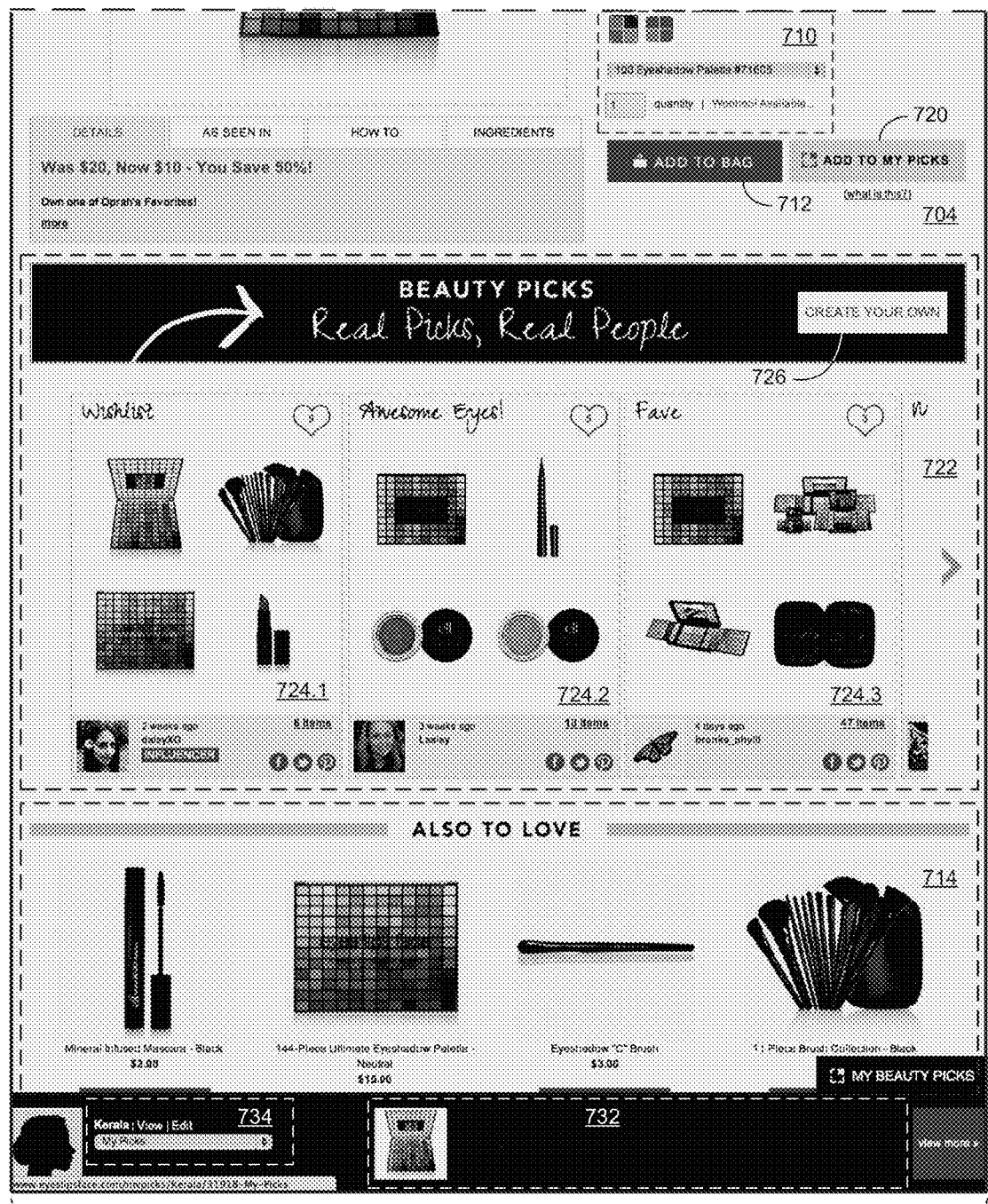

FIGS. 7a and 7b show a Pick List fly-out user interface window implemented in accordance with an embodiment of the invention to manage a plurality of Pick Lists. In various embodiments, Picks System functionality is implemented in a merchant's website. In certain of these embodiments, predetermined Picks System functionality is exposed to the user within a user interface (UI) window, such as a product details UI window 702 of the merchant's website. In this embodiment, the product details UI window 702 includes a featured product sub-window 704, which includes details associated with an individual featured product (e.g., product description, pricing, etc.), and a suggested products sub-window 714, which includes summary descriptions of a plurality of suggested products.

Referring to FIG. 7a, the featured product sub-window 704 also includes a "Write a Review" command button 706, which allows a Picks User to post a review of the featured product when selected through a user gesture, such as a mouse-click with a cursor. In certain embodiments, the featured product sub-window 704 includes a plurality of "Share with Friends" command buttons 708. In these embodiments, a Picks System user is provided the ability to socially share the featured product to a predetermined social media site (e.g., Facebook®, Twitter®, etc.) by selecting a corresponding "Share with Friends" command button 708 with a user gesture. In various embodiments, the featured product sub-window 704 includes a modal shopping sub-window 710, described in greater detail herein, which displays different options (e.g., quantity, colors, sizes, styles, etc.) that are available for the featured product.

In certain embodiments, the featured product sub-window 704 includes an "Add to Bag" command button 712. In these embodiments, the featured product is added to the user's shopping cart by selecting the "Add to Bag" command button 712 through a user gesture. In various embodiments, an "Add to My Picks" 720 control button is displayed to the Picks System user within the product details UI window 704. In certain embodiments, selection of the "Add to My Picks" 720 control button presents the Picks System user additional user controls, which allow the user to specify which Pick List the product should be added to. In various embodiments, a plurality of Pick Lists 724.1, 724.2, 724.3 associated with various Pick List users are displayed within a Pick Lists sub-window 722. In these embodiments, a Picks System user is able to create a new Pick List by selecting a "Create Your Own" command button 726.

In various embodiments, a Picks fly-out UI window 730 is implemented to provide the Picks System user the ability to perform Pick List editing operations on a predetermined Pick List. In certain embodiments, the Picks fly-out UI window 730 is implemented to display thumbnail images 732 of their existing Pick Lists. In these embodiments, a target thumbnail image 732 is selected by the Picks System user, who then uses controls 734 to view or edit the Pick List corresponding to the selected thumbnail image 732.

In certain embodiments, the Picks fly-out UI window 730 is implemented to provide the Picks System user the ability to delete individual products from the Pick List, rearrange the display order of products, rename, or delete the Pick List from the Picks System. In various embodiments, the Picks system automatically creates a Picks Detail Page that provides a list of products contained in the Pick List. In certain embodiments, the Picks System provides access to additional information and capabilities depending upon the context of the Picks System user viewing the Picks Detail Page. In various embodiments, the Picks fly-out UI window 730 is implemented to provide the Picks System user the ability to directly access the Picks Detail Page.

Figure 8A:
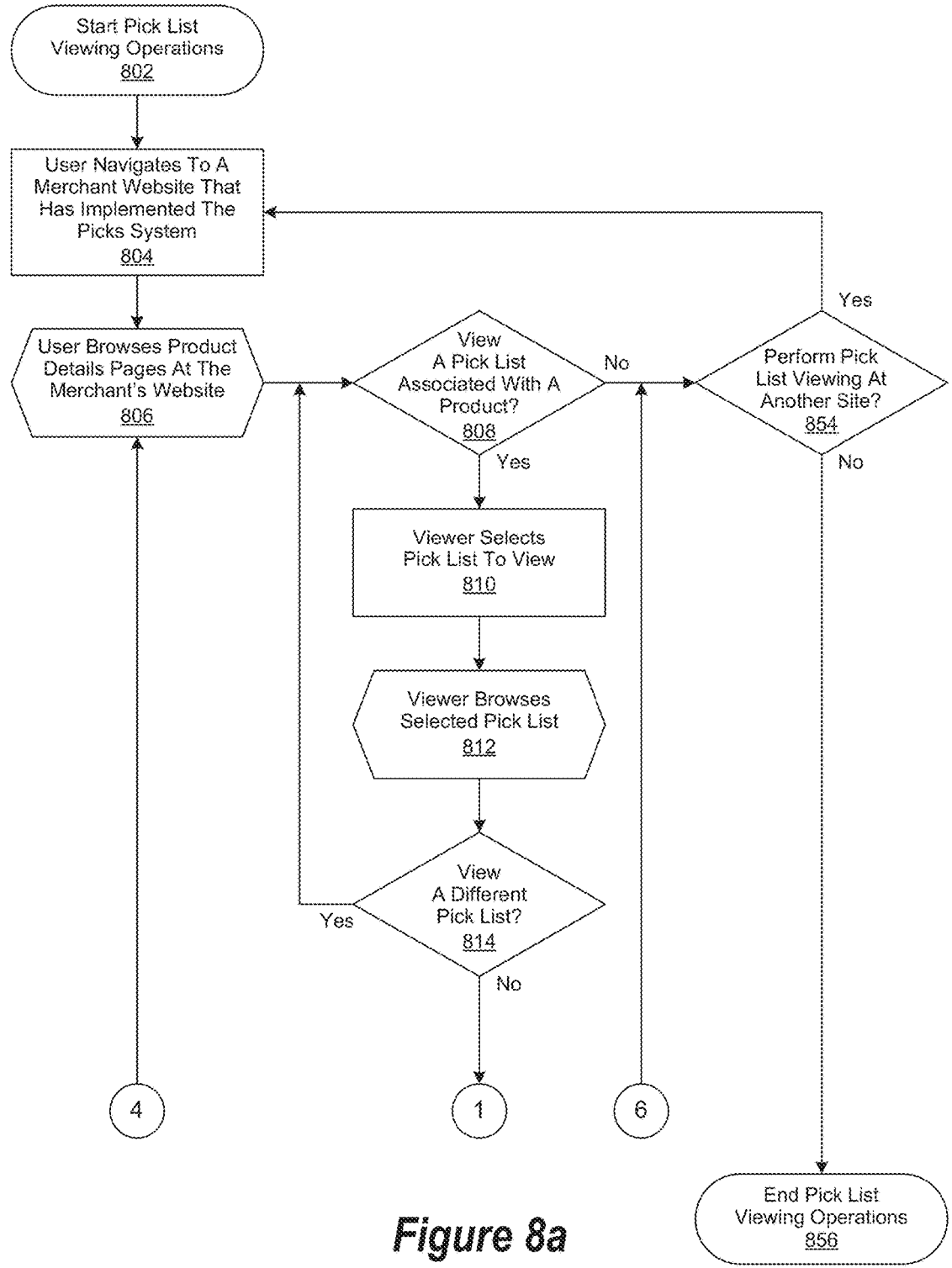
FIGS. 8a through 8c are a generalized flowchart of the performance of Pick List viewing operations in an electronic commerce environment.
Figure 8B:
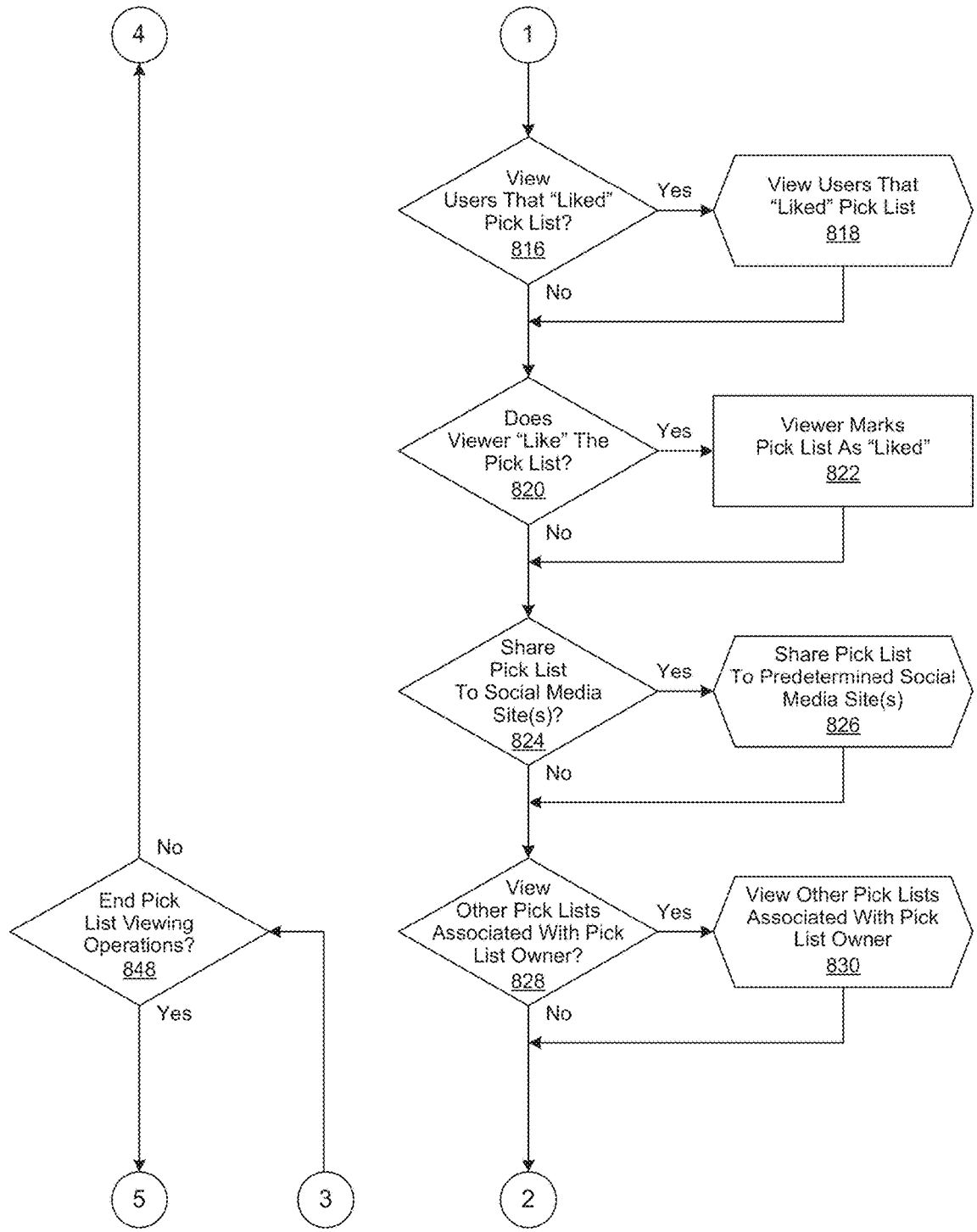
Figure 8C:
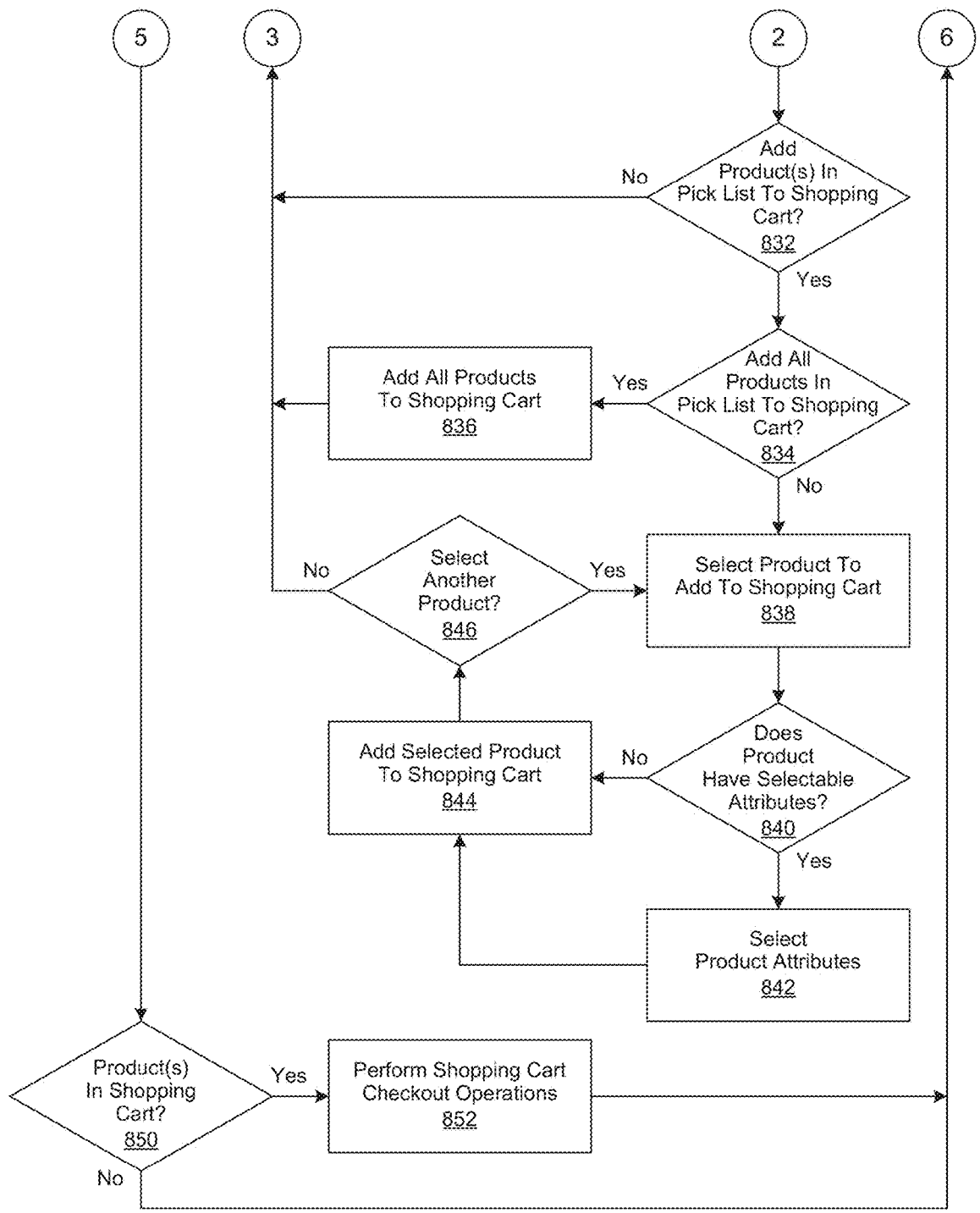

FIGS. 8a through 8c are a generalized flowchart of Pick List viewing operations performed in accordance with an embodiment of the invention in an electronic commerce environment. In this embodiment, Pick List viewing operations are begun in step 802, followed by a user navigating in step 804 to a merchant's web site that has implemented the Picks System. The user then browses product details pages at the merchant's website in step 806, followed by a determination being made in step 808 whether to view a Pick List associated with a product in step 808. If not, then a determination is made in step 854 whether to perform Pick List viewing operations at another merchant's website. If so, then the process is continued, proceeding with step 804. Otherwise, Pick List viewing operations are ended in step 856.

However, if it was determined in step 806 to view a Pick List associated with a product displayed on merchant's product details page, then the viewer selects a Pick List to view in step 810. The selected Pick list is then browsed by the viewer in step 812. In various embodiments, viewing the Pick List provides the viewer a list of the products within the Pick List, including their associated product name, product title, product ratings, and price. In certain embodiments, selecting product listed in the Pick List with a user gesture, such as a mouse click, allows the viewer to add the selected product to their shopping cart as described in greater detail herein.

A determination is then made in step 814 whether to view a different Pick List. If so, then the process is continued, proceeding with step 808. Otherwise, a determination is made in step 816 whether the viewer wishes to view other users who "liked" the selected Pick List. If so, then a list of other users who "liked" the selected Pick list is displayed to the viewer in step 818. In certain embodiments, the Picks System is implemented to allow the viewer to "click through" a listed viewer to access that the viewer's associated Pick Lists, Pick Collages, and Picks user profile. After the viewer has completed viewing the viewers that "liked" the Pick List, or if it was determined in step 816 not to view users that "liked" the Pick List, a determination is made in step 820 whether the viewer wishes to "like" the Pick List. If so, then the viewer performs a user gesture in step 822 to mark the Pick List as a Pick List they "liked."

After the viewer has marked the Pick List in step 822 as a Pick List they "liked," or if it was determined in step 820 not to mark the selected Pick List as a Pick List they "liked," a determination is made in step 824 whether the viewer wishes to "share" the Pick List to a social media site. If so, then the viewer performs social media "sharing" operations familiar to those of skill in the art in step 826 to "share" the Pick List to one or more social media sites (e.g., Facebook®, Twitter® or Pinterest®, etc.). In certain embodiments, social media control buttons are implemented to facilitate the viewer in "sharing" the Pick List to one or more social media sites. In various embodiments, a Picks Detail Page, described in greater detail herein, is displayed to the viewer. In these embodiments, the viewer performs social media "sharing" operations familiar to those of skill in the art in step 826 to socially share the Picks Detail Page to one or more social media sites. In certain embodiments, social media control buttons are implemented to facilitate the viewer in "sharing" the Pick Details Page to one or more social media sites.

After the viewer has performed Pick List social media "sharing" operations in step 826, or if it was determined in step 824 not to "share" the selected Pick List to one or more social media sites, a determination is made in step 828 whether the viewer wishes to view other Pick Lists associated with the creator of the currently selected Pick List. If so, then the viewer views other Pick Lists associated with creator of the currently selected Pick List in step 830. After the viewer has viewed other Pick Lists associated with the creator of the currently selected Pick List step 830, or if it was determined in step 828 not to view other Pick Lists associated with the creator of the currently selected Pick List, a determination is made in step 832 whether the viewer wishes to add one or more products in the selected Pick List to their shopping cart.

If it was determined in step 832 that the viewer did not wish to add one or more products in the Pick List to their shopping cart, then a determination is made in step 848 whether to end Pick List viewing operations. If not, then the process is continued, proceeding with step 806. However, if it was determined in step 832 to add one or more products in the selected Pick List, then a determination is made in step 834 whether the viewer wishes to add all of the products in the selected Pick List to their shopping cart. If so, then they are added in step 836. However, if it was determined in step 834 that the viewer does not wish to add all of the products in the selected Pick List to their shopping cart, then a product in the Pick List is selected in step 838, followed by a determination being made in step 840 whether the selected product has any selectable attributes. If so, then the viewer selects the desired product attributes in step 842 and the selected product is added to the shopping cart in step 844, followed by a determination being made in step 846 whether the viewer wishes to select another product. If so, the process is continued, proceeding with step 838.

Otherwise, or once all products in the selected Pick List are added to the viewer's shopping cart in step 836, or if it was determined in step 832 not to add one or more products to the viewer's shopping cart, then the process is continued, proceeding with step 848. However, if it is determined in step 848 to end Pick List viewing operations, then a determination is then made in step 850 whether there are products in the viewer's shopping cart. If so, then shopping cart checkout operations familiar to those of skill in the art are performed in step 852. Thereafter, or if it was determined in step 850 that there are no products in the viewer's shopping cart, then the process is continued, proceeding with step 854.

Figure 9A:
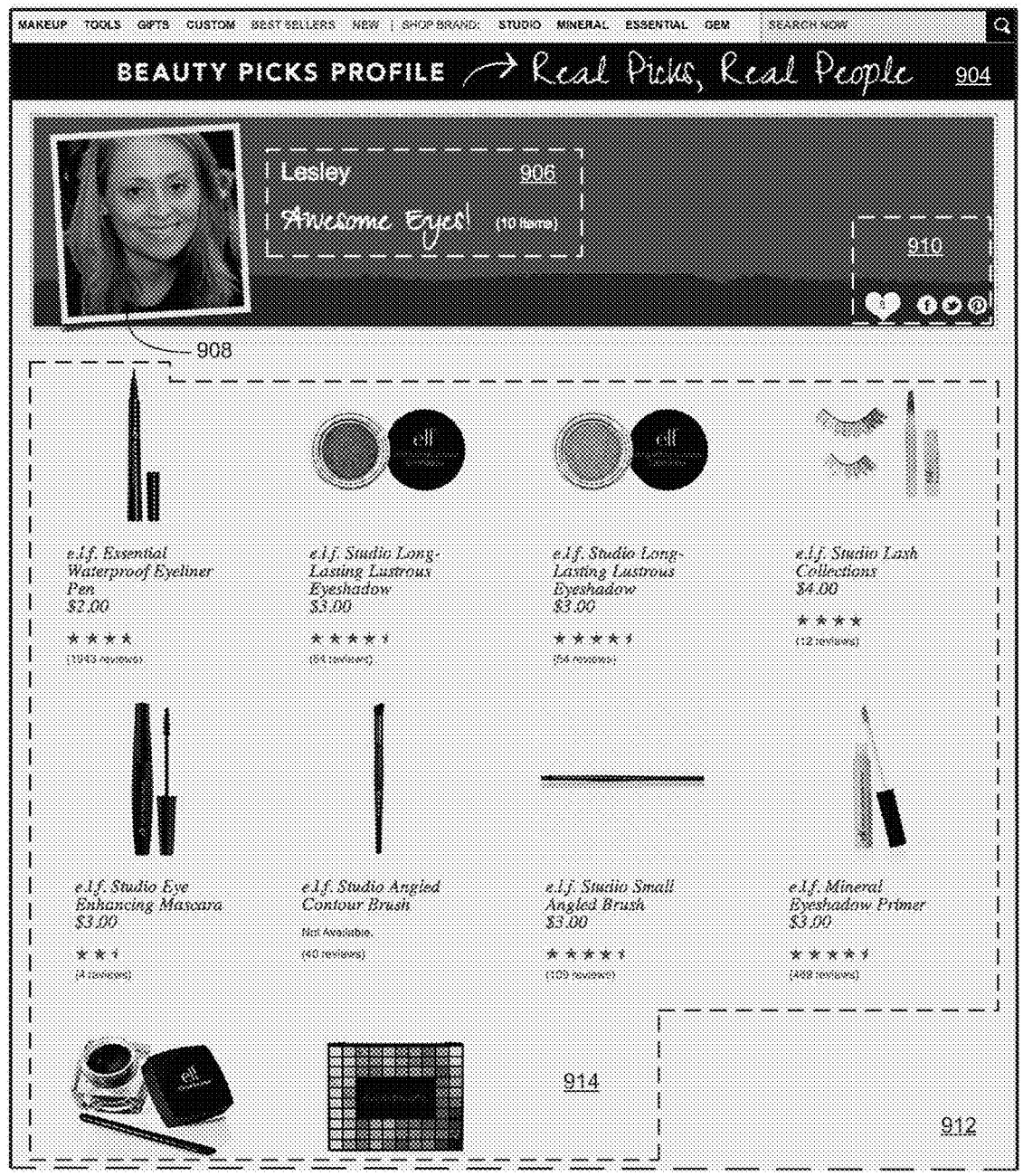
FIGS. 9 and 9b show the display of individual products associated with a Pick List within a UI window.
Figure 9B:
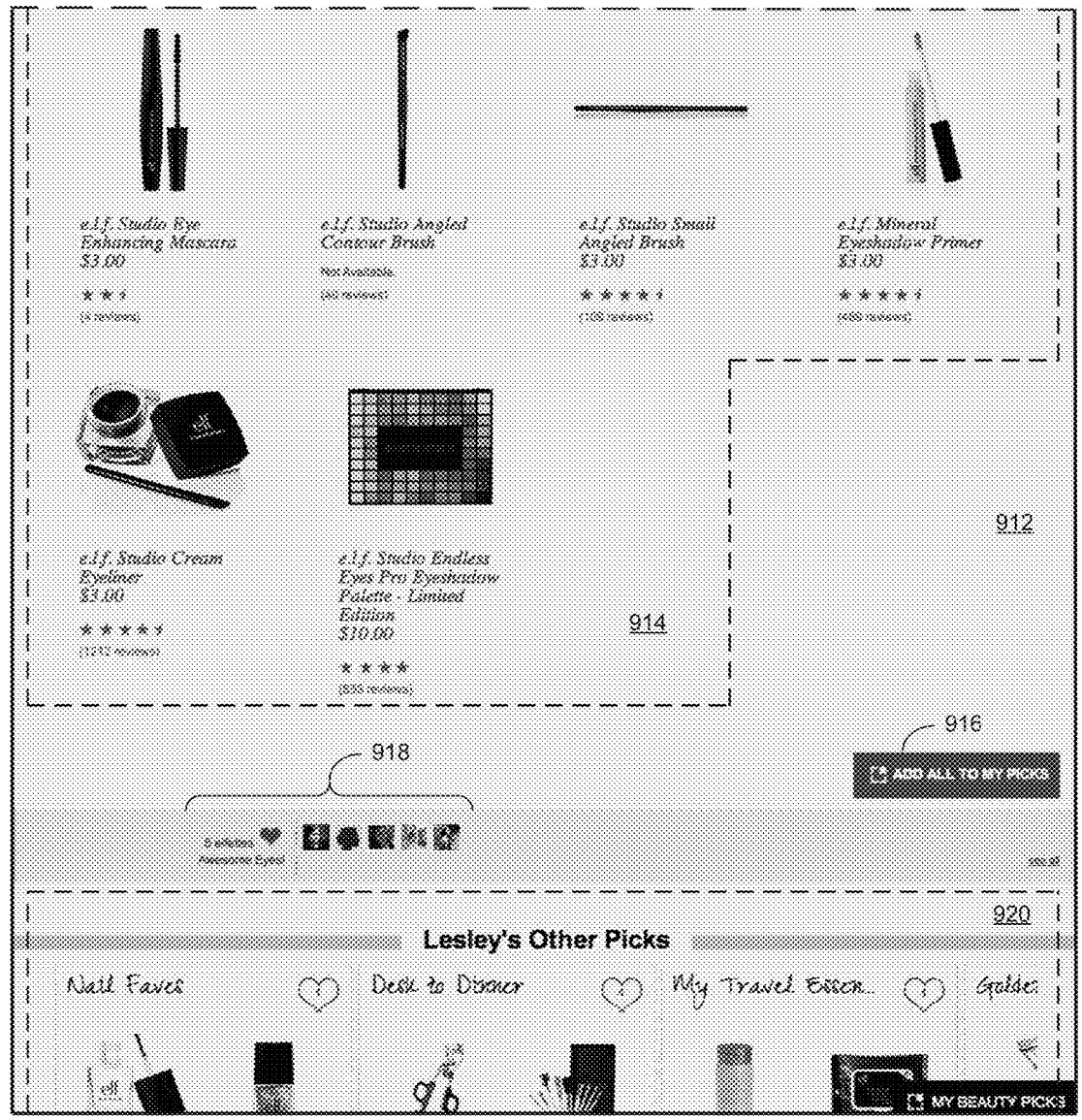

FIGS. 9a and 9b show the display individual products associated with a Pick List within a user interface (UI) window implemented in accordance with an embodiment of the invention. In various embodiments, individual products 914 associated with a Pick List are displayed within a Pick List content UI window 912. In various embodiments, the Picks user profile 904 of the creator of the Pick list is displayed in conjunction with the Pick List content UI window 912. In certain embodiments, the Picks user profile 904 may display the Pick List creator's Picks screen name 906, their Picks avatar 908, and the number of their "followers" 910 on social media sites. In various embodiments, thumbnail images 918 of the followers are displayed. In one embodiment, the viewer of the Pick List content UI window 912 can add all of the individual products 914 to their own Pick List by selecting the "Add All to My Picks" command button 916 with a user gesture, such as a mouse-click with a cursor. In various embodiments, other Pick Lists 920 created by the creator of the Pick List shown in the Pick List content UI window 912 are displayed. In certain embodiments, the viewer of the other Pick Lists 920 can "click-through" to the other Pick Lists 920 with a user gesture, such as a mouse-click with a cursor.

Figure 10A:
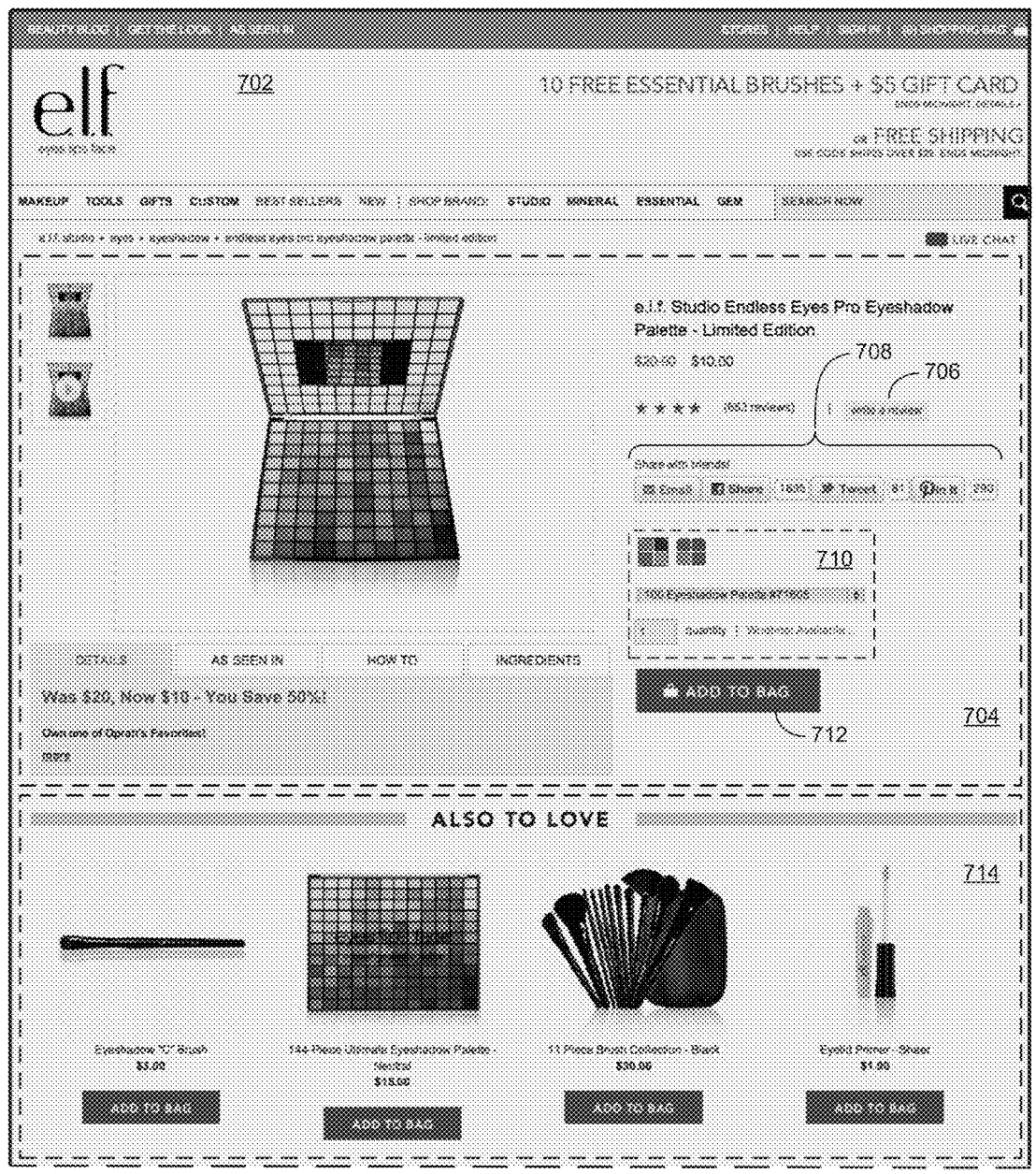
Figure 10B:
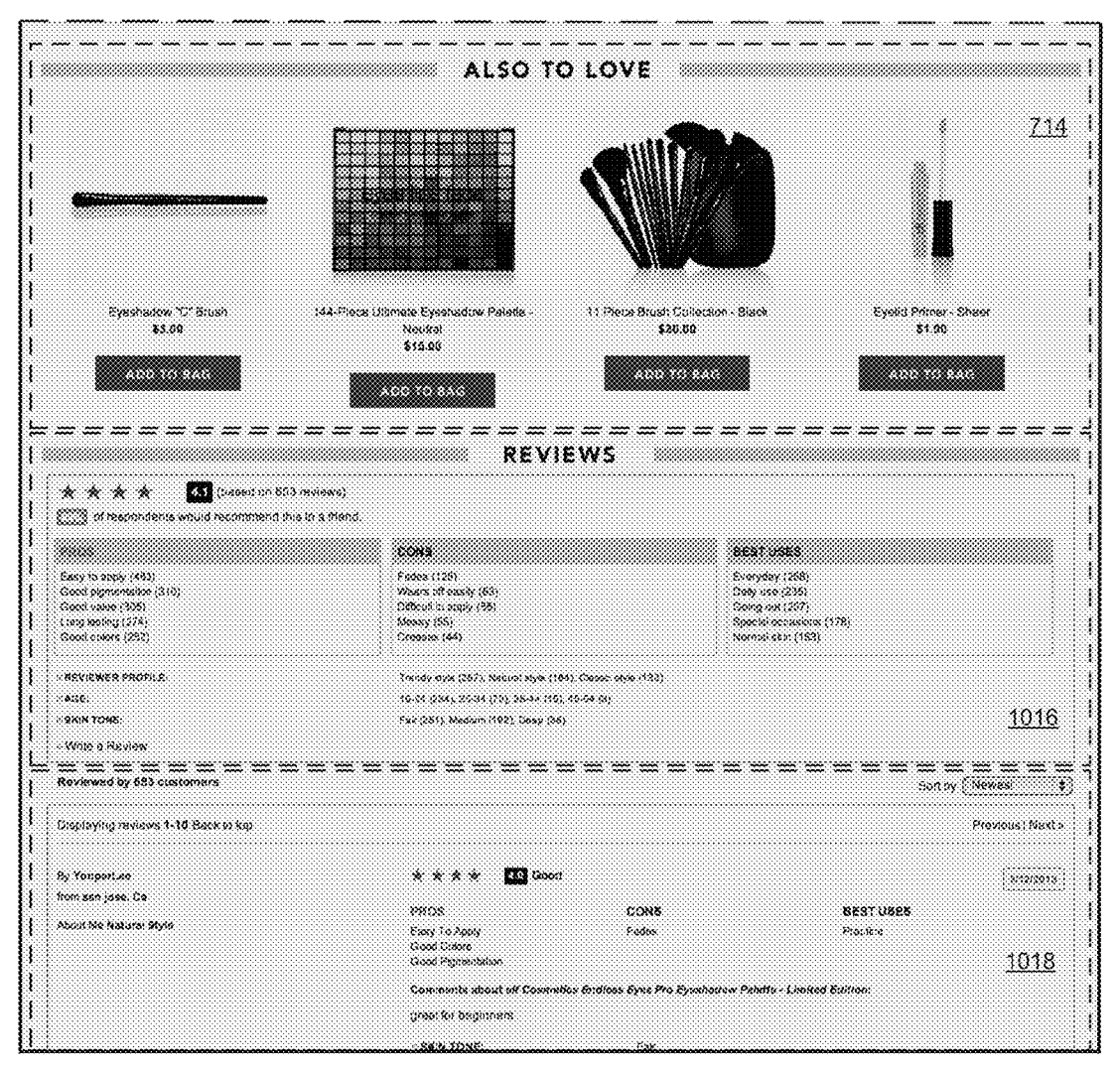

FIGS. 10a and 10b show the display of product details and associated user reviews and recommendations within a user interface (UI) window implemented in accordance with an embodiment of the invention. In various embodiments, Picks System functionality is implemented in a merchant's website. In certain of these embodiments, predetermined Picks System functionality is exposed to the user within a UI window, such as a product details UI window 702 of the merchant's website. In this embodiment, the product details UI window 702 includes a featured product sub-window 704, which includes details associated with an individual featured product (e.g., product description, pricing, etc.), and a suggested products sub-window 714, which includes summary descriptions of a plurality of suggested products. As shown in FIG. 10b, the product details UI window 702 also includes a summarized product review sub-window 1016, which includes summary information associated with users' reviews of the product displayed in the featured product sub-window 704. Likewise, the product details UI window 702 includes an individual product review sub-window 1018, which includes a plurality of individual users' reviews of the product displayed in the featured product sub-window 704.

Referring to FIG. 10a, the featured product sub-window 704 also includes a "Write a Review" command button 706, which allows a Picks User to post a review of the featured product when selected through a user gesture, such as a mouse-click with a cursor. In various embodiments, the resulting product review is displayed within the individual product review sub-window 1018. In certain embodiments, the featured product sub-window 704 includes a plurality of "Share with Friends" command buttons 708. In these embodiments, a Picks System user is provided the ability to socially share the featured product to a predetermined social media site (e.g., Facebook®, Twitter®, etc.) by selecting a corresponding "Share with Friends" command button 708 with a user gesture. In various embodiments, the featured product sub-window 704 includes a modal shopping sub-window 710, described in greater detail herein, which displays different options (e.g., quantity, colors, sizes, styles, etc.) that are available for the featured product. In certain embodiments, the featured product sub-window 704 includes an "Add to Bag" command button 712. In these embodiments, the featured product is added to the user's shopping cart by selecting the "Add to Bag" command button 712 through a user gesture.

Figure 11A:
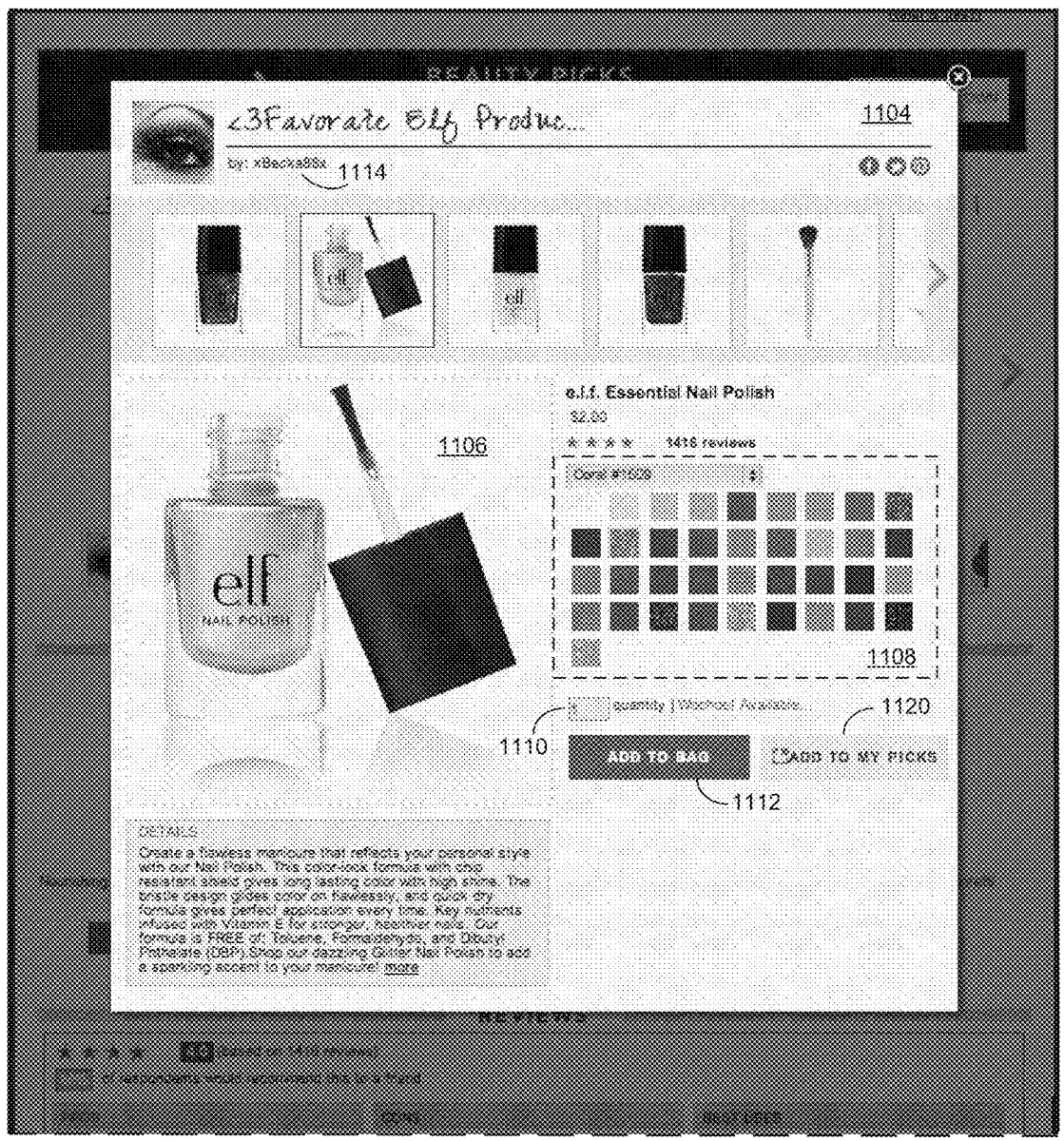
FIGS. 11a and 11b show a modal shopping sub-window implemented within a UI window.
Figure 11B:
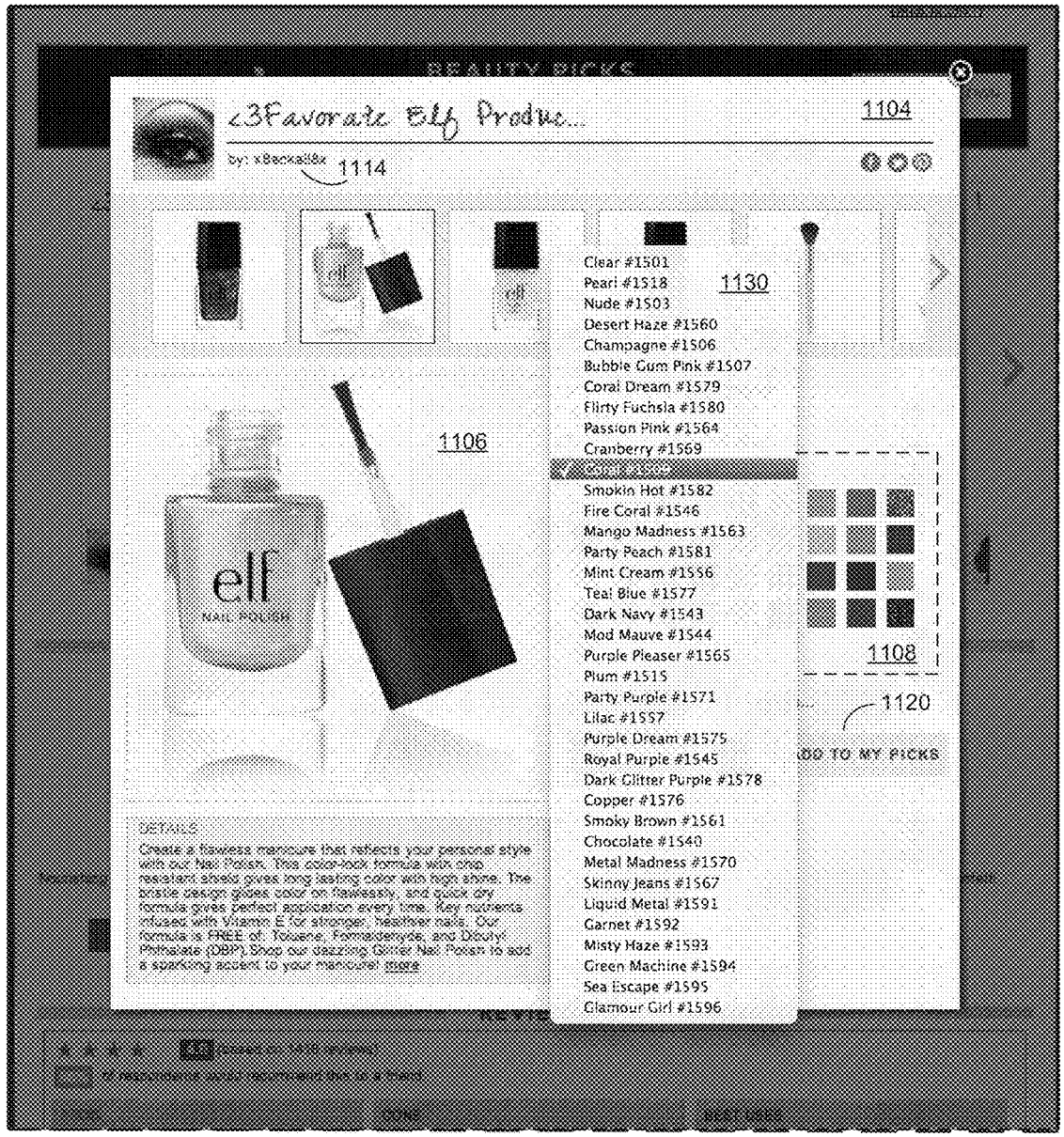

FIGS. 11a and 11b show a modal shopping sub-window implemented within a user interface (UI) window in accordance with an embodiment of the invention. In various embodiments, a modal shopping sub-window 1104 is implemented to allow a viewer of a Pick List to select a product 1106 listed within the Pick List with a user gesture, such as a mouse-click on the "Add to Bag" command button 1112, to add it to their shopping cart. In certain embodiments, the modal shopping sub-window is implemented to allow the viewer of the Pick List to select product variations 1108 (e.g., color, size, etc.) and quantity 1110 before adding their selection to their shopping cart. In various embodiments, the Picks screen name 1114 of the creator of the Pick List is displayed within the modal shopping sub-window 1104. In certain embodiments, the viewer can "click-through" the Picks screen name 1114, which hyperlinks the viewer to the Pick List creator's Picks user profile. In various embodiments, a product list drop-down menu 1130 is implemented within the modal shopping sub-window 1104, which lists product options for the selected product 1106.

Figure 12A:
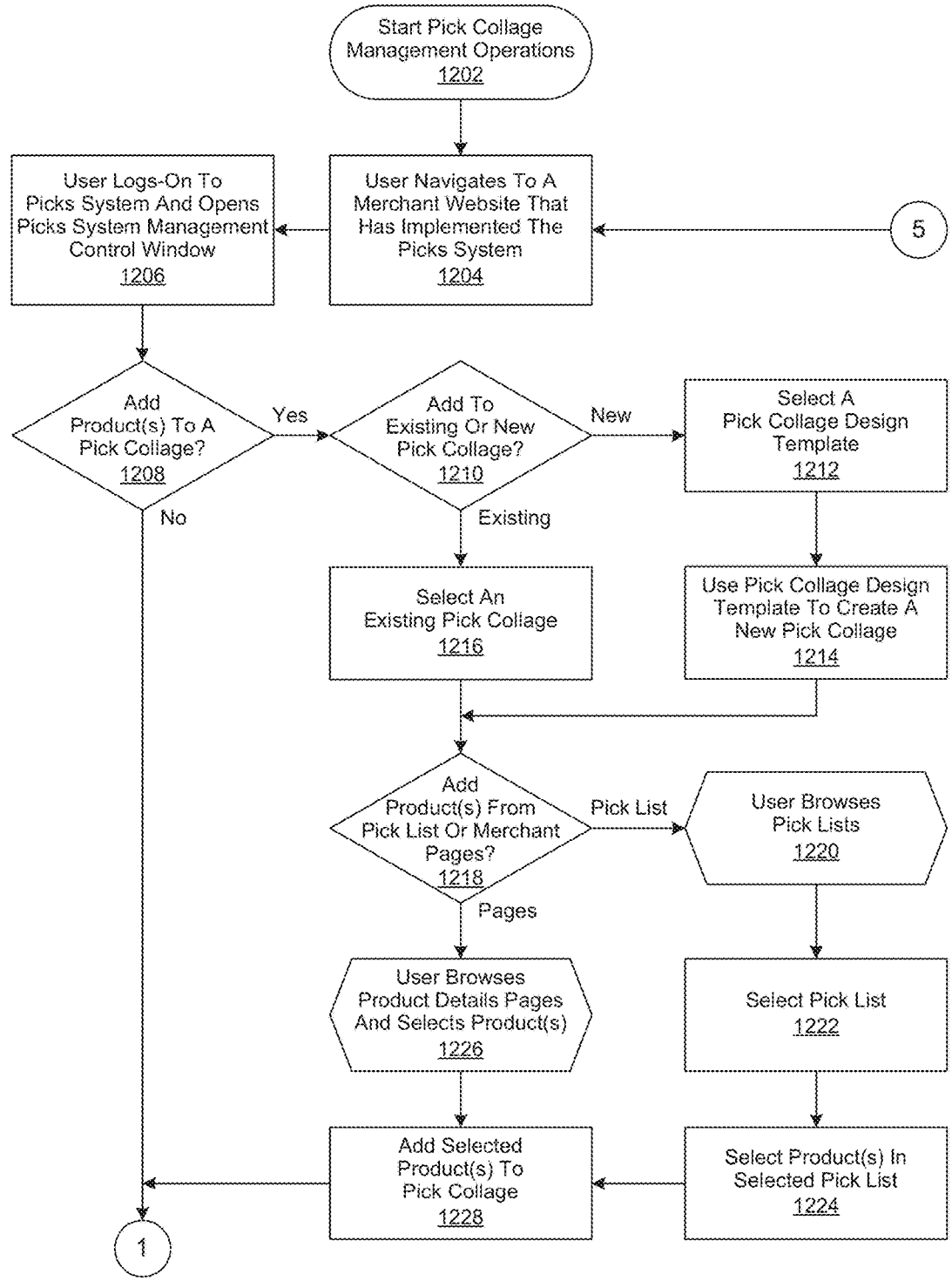
FIGS. 12a and 12b are a generalized flowchart of the performance of Pick Collage management operations in an electronic commerce environment.
Figure 12B:
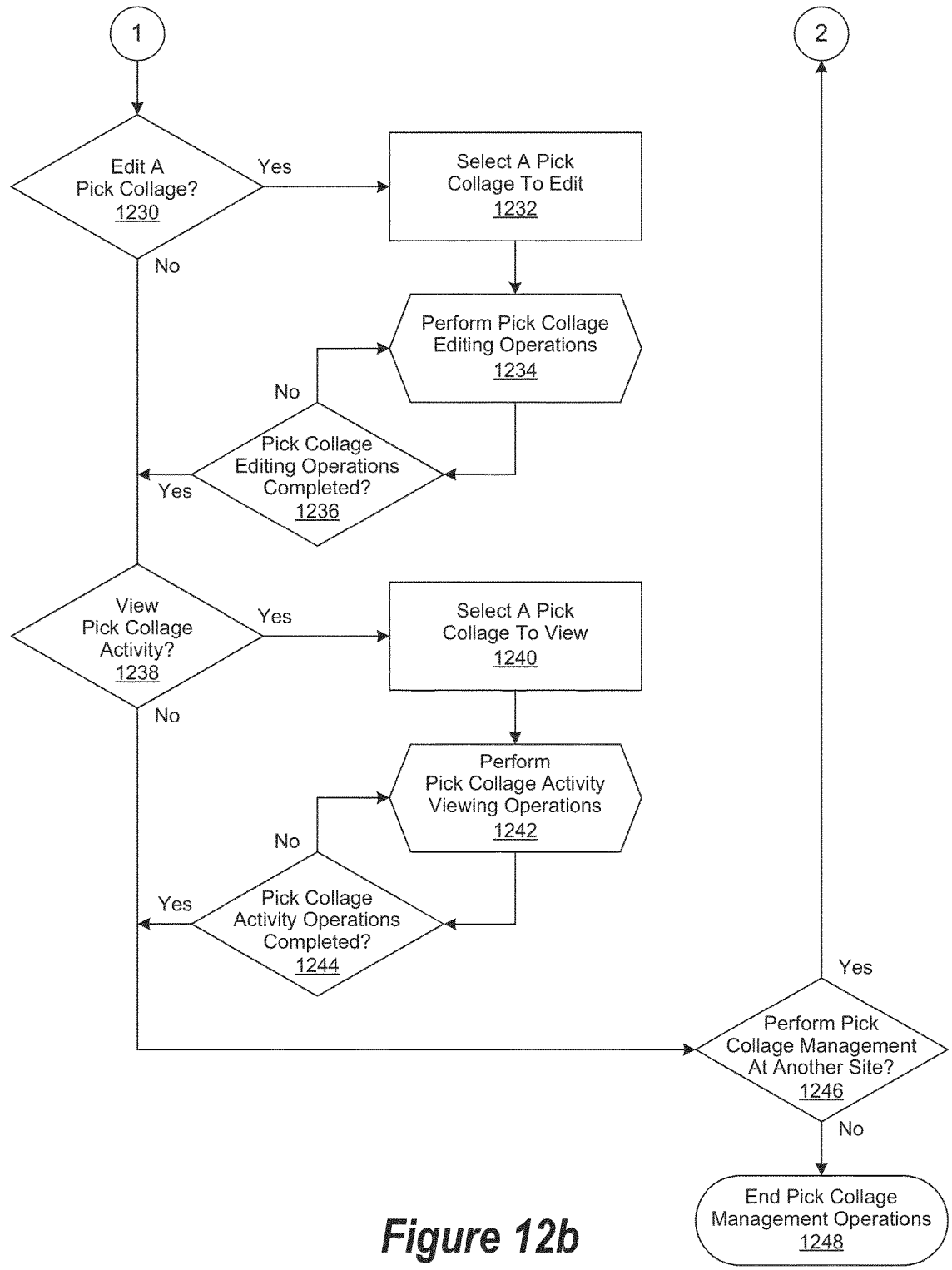

FIGS. 12a and 12b are a generalized flowchart of Pick Collage management operations performed in accordance with an embodiment of the invention in an electronic commerce environment. In various embodiments, one or more Pick Collages are implemented to allow Pick System users to choose a different visual layout for products in existing Pick Lists. In certain embodiments, a Pick System user is able to select from a plurality of Pick Collage templates, each of which includes various design parameters, such as a visual layout, a background image, a color palette, and a typeface.

In various embodiments, Pick Collages are created from one or more existing Pick Lists. In certain embodiments, Pick Collages are displayed on a merchant's website product details pages, the Pick Collage creator's Picks user profile, or both. In various embodiments, a predetermined Pick List displays the products in a simple layout while a Pick Collage displays the same products in a more creative rendering. As such, Pick Collages allow Pick Collage creators to select products from one or more of their existing Pick Lists, select an existing Pick Collage design template, and then populate the selected Pick Collage design template with the selected products.

In this embodiment, Pick Collage management operations are begun in step 1202, followed by a user navigating in step 1204 to a merchant's web site that has implemented the Picks System. Then, in step 1206, the user logs-on to the Picks System as described in greater detail herein, and then opens a Picks System Management control window. In various embodiments, the Picks System Management control window includes a Picks fly-out user interface (UI) window described in greater detail herein. In certain embodiments, all of the functionality provided by the Picks fly-out UI window for managing a Pick List is implemented to likewise manage a Pick Collage.

A determination is then made in step 1208 to determine whether to add one or more products to a Pick Collage. If so, then a determination is made in step 1210 whether the product is to be added to an existing or new Pick Collage. If it is determined in step 1210 that the product is to be added to a new Pick Collage, then a Pick Collage design template is selected in step 1212 and then used in step 1214 to create a new Pick Collage. However, if it was determined in step 1210 that the product is to be added to an existing Pick Collage, then an existing Pick Collage is selected in step 1216. Once a new Pick Collage has been created in step 1214, or an existing Pick Collage has been selected in step 1216, a determination is made in step 1218 whether one or more products are to be added from an existing Pick List or a merchant's product details page.

If it is determined in step 1218 that the one or more products are to be added from an existing Pick List, then the Picks System user first browses available Pick Lists in step 1220 and then selects a Pick List in step 1222. Once the Pick List is selected in step 1233, the Picks System user then selects one or more products from the selected Pick List in step 1224. However, if it was determined in step 1218 that the one or more product are to be added from a merchant's product details page, then the Picks System user browses the merchant's detail pages and selects the one or more products in step 1226. Thereafter, or once the one or more products are selected from an existing Pick List in step 1224, the selected one or more products are added to the existing or newly-created Pick Collage in step 1228.

Thereafter, or if it was determined in step 1208 not to add one or more products to a Pick Collage, a determination is made in step 1230 whether to edit a Pick Collage. If so, then a Pick Collage is selected in step 1232 to edit. Pick Collage editing operations are then performed on the selected Pick Collage in step 1234. Once Pick Collage editing operations are performed in step 1234, a determination is made in step 1236 whether Pick Collage editing operations are completed. If not, then the process is continued, proceeding with step 1234. Otherwise, or if it was determined in step 1230 not to edit a Pick Collage, a determination is made in step 1238 whether to view Pick Collage activity. If so, then a Pick Collage to view is selected in step 1240, followed by the performance if Pick Collage activity viewing operations in step 1242.

In various embodiments, viewers of a Pick Collage are provided the ability to "follow" the creator of the Pick Collage. In certain embodiments, the user's Picks user profile displays who the Picks System user is following. In various embodiments, the Picks System is implemented to provide an ongoing update of Pick Collage activities, herein referred to as a "Picks Activity Feed," related to the Pick System user. In certain embodiments, the Picks Activity Feed is provided in the form of a "Public View." In these embodiments, only predetermined Picks Activity Feed information associated with a Pick System user is displayed to viewers of the user's Picks user profile. In one embodiment, the predetermined Picks Activity Feed information only includes Pick Collage activities that the Picks System user has completed. In various embodiments, the Public View of the Picks Activity Feed provides a list of the Pick Collage that the Picks System user has created. In certain embodiments, the Public View of the Picks Activity Feed provides a list of the Pick Collages that the Picks System user has "liked." In certain embodiments, the Picks Activity Feed is provided in the form of a "Private View." In these embodiments, the Picks Activity Feed information includes activities completed by the user as well as activities associated with other users' Pick Lists, Pick Collages, and Picks user profiles.

Once Pick Collage activity viewing operations have been performed in step 1242, a determination is made in step 1244 whether Picks List activity viewing operations have been completed. If not, then the process is continued, proceeding with step 1242. Otherwise, or if it was determined in step 1238 not to view Pick Collage activity, a determination is made in step 1246 whether to continue Pick Collage management operations at another merchant's web site. If so, then the process is continued, proceeding with step 1204. Otherwise, the process is continued, proceeding with step 1248.

Figure 13A:
FIGS. 13a and 13b show a Pick Collage Management UI window implemented to manage a Pick Collage.
Figure 13B:
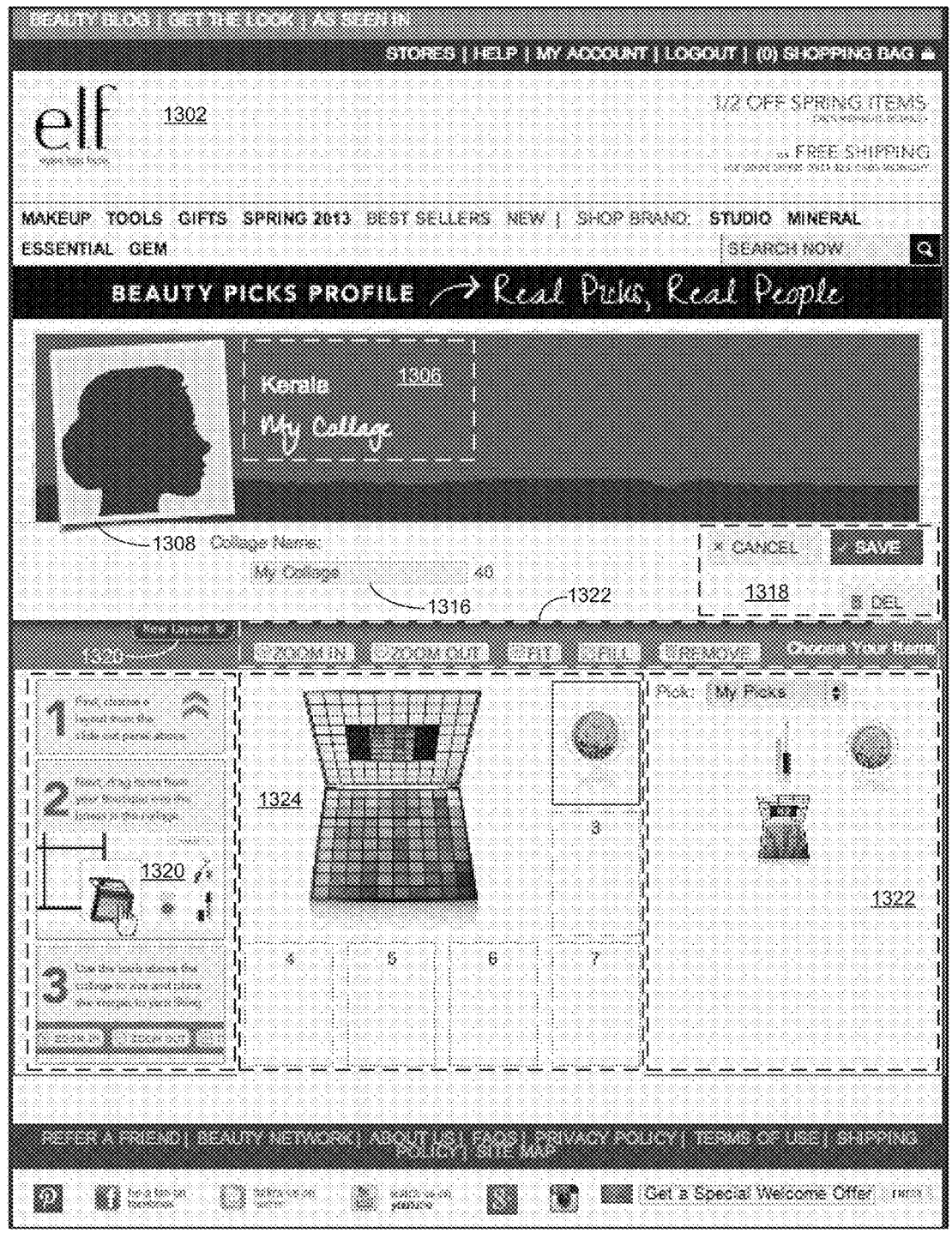

FIGS. 13a and 13b show a Pick Collage Management user interface (UI) window implemented in accordance with an embodiment of the invention to manage a Pick Collage. In this embodiment, the Pick Collage Management UI window 1302 includes certain Picks user profile information associated with the Pick System user, such as their Picks screen name 1306 and Picks avatar 1308. The Pick Collage Management UI window 1302 also includes a Pick List window 1314, which displays products that the Pick System user has added to a Pick List, and "Create Collage" 1310 and "Edit" 1312 command buttons, which are respectively used to access Pick Collage creation and editing functions shown in FIG. 7b.

In various embodiments, various Pick Collage templates are provided, which offer different backgrounds and positioning to give the Pick Collage creator control over which products are displayed in which positions. As shown in FIG. 7b, a Pick Collage template is selected in one embodiment by the Pick Collage creator selecting a "New Layout" control button 1320. Once a Pick Collage template has been selected, it can be given a Collage Name 1316.

As likewise shown in FIG. 7b, the Pick System user is provided a series of Pick Collage creation instructions 1320, which guide the selection of individual Pick List products 1322 and the use of Pick Collage editing controls 1322. As the Pick System user selects the individual Pick List products 1322, and uses the Pick Collage editing controls 1322, the Pick Collage template 1324 is populated. Thereafter, the Pick Collage can then be saved or canceled by respectively selecting the "Save" of "Cancel" command buttons 1318.

Figure 14A:
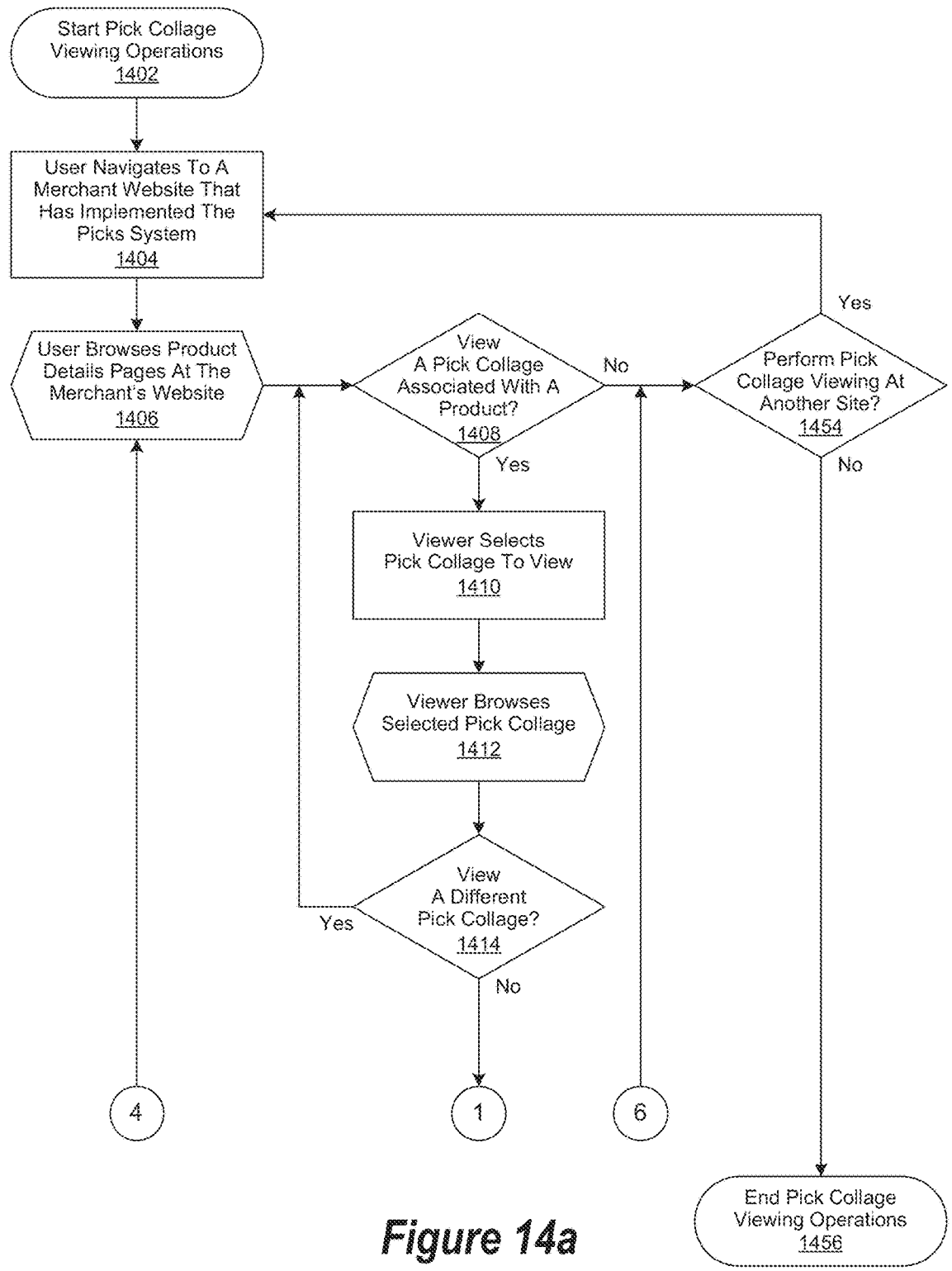
FIGS. 14a through 14c are a generalized flowchart of the performance of Pick Collage viewing operations in an electronic commerce environment.
Figure 14B:
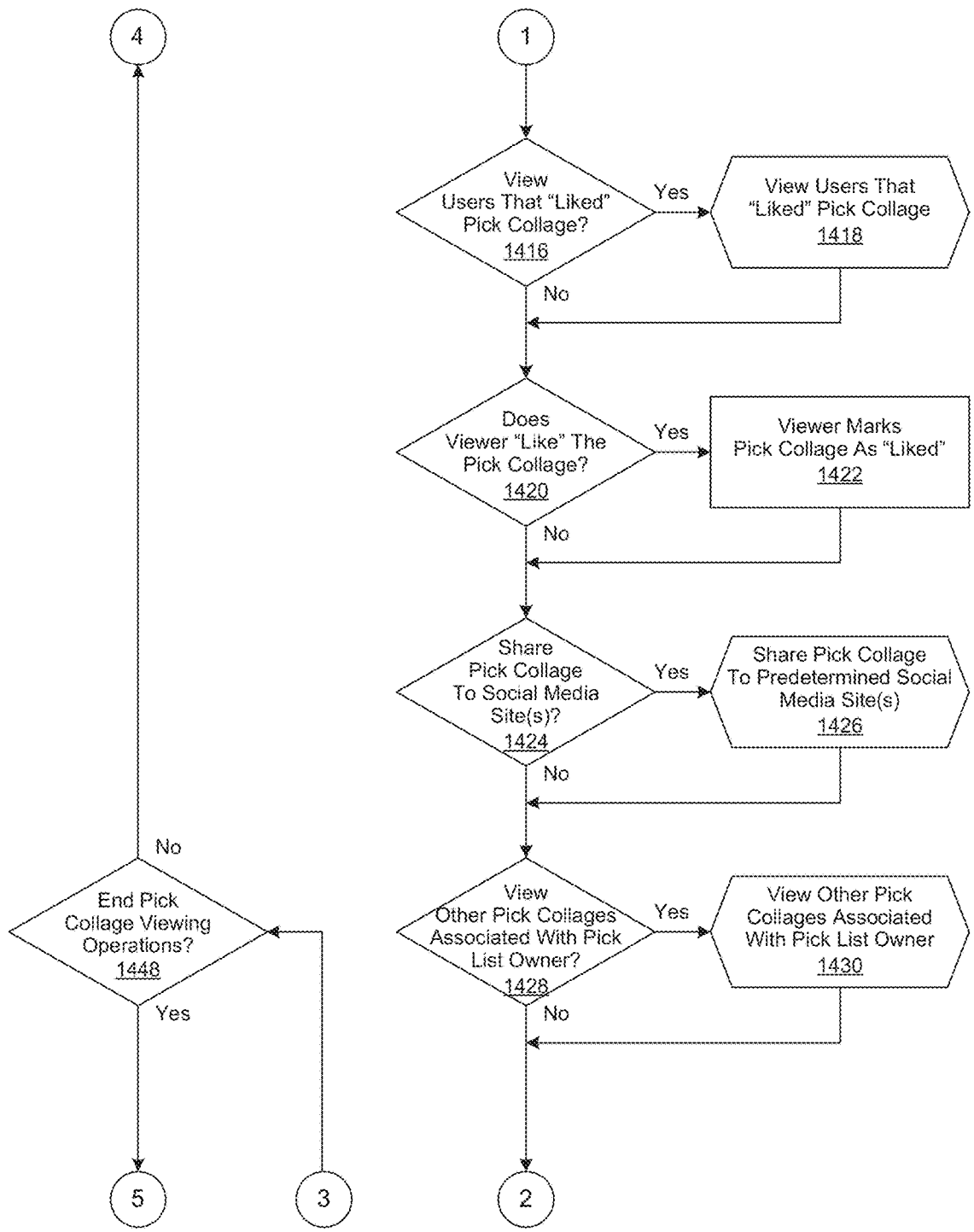
Figure 14C:
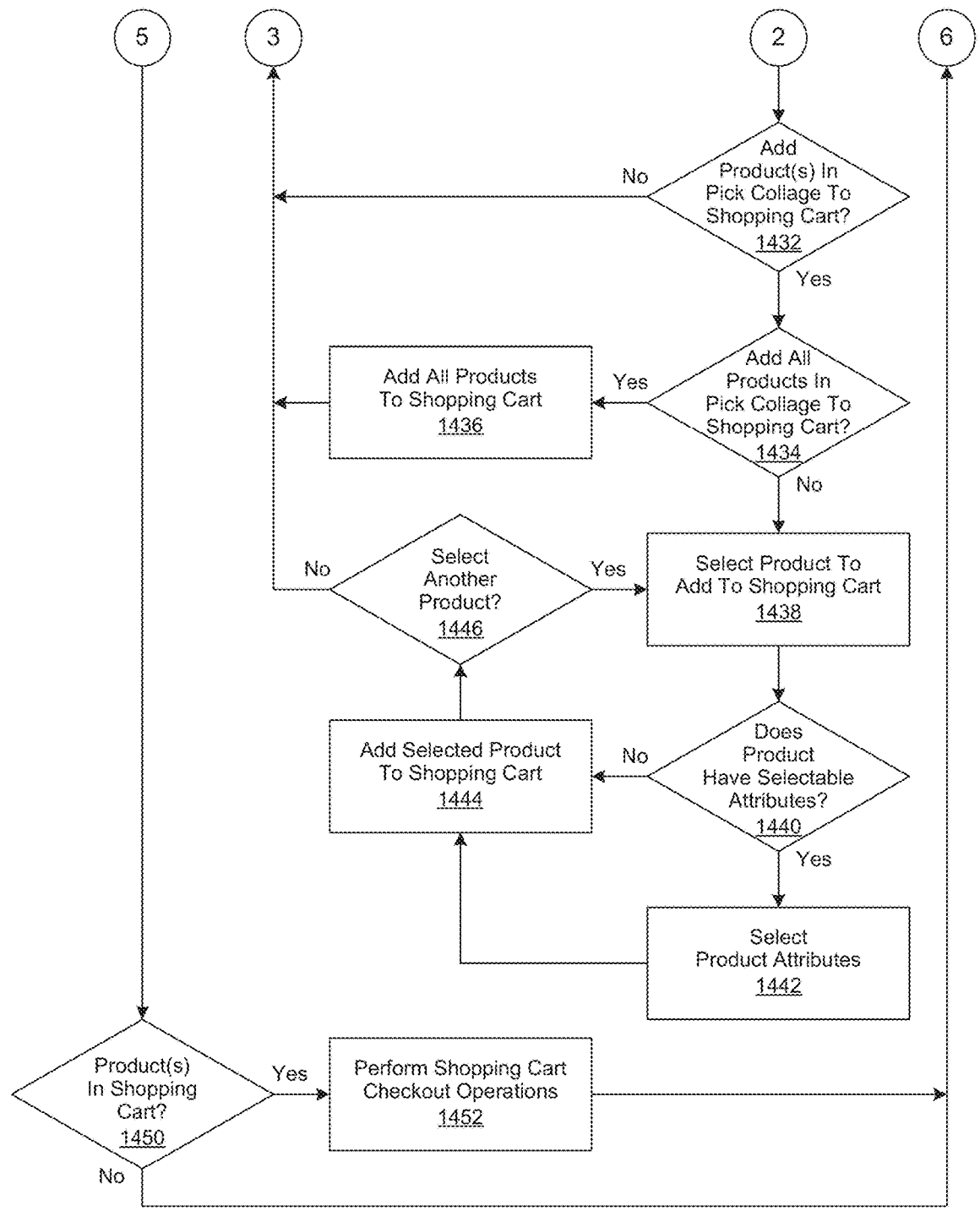

FIGS. 14a through 14c are a generalized flowchart of Pick Collage viewing operations performed in accordance with an embodiment of the invention in an electronic commerce environment. In this embodiment, Pick Collage viewing operations are begun in step 1402, followed by a user navigating in step 1404 to a merchant's web site that has implemented the Picks System. The user then browses product details pages at the merchant's website in step 1406, followed by a determination being made in step 1408 whether to view a Pick Collage associated with a product in step 1408. If not, then a determination is made in step 1454 whether to perform Pick Collage viewing operations at another merchant's website. If so, then the process is continued, proceeding with step 1404. Otherwise, Pick Collage viewing operations are ended in step 1456.

However, if it was determined in step 1406 to view a Pick Collage associated with a product displayed on merchant's product details page, then the viewer selects a Pick Collage to view in step 1410. The selected Pick list is then browsed by the viewer in step 1412. In various embodiments, viewing the Pick Collage provides the viewer a list of the products within the Pick Collage, including their associated product name, product title, product ratings, and price. In certain embodiments, selecting product listed in the Pick Collage with a user gesture, such as a mouse click, allows the viewer to add the selected product to their shopping cart as described in greater detail herein.

A determination is then made in step 1414 whether to view a different Pick Collage. If so, then the process is continued, proceeding with step 1408. Otherwise, a determination is made in step 1416 whether the viewer wishes to view other users who "liked" the selected Pick Collage. If so, then a list of other users who "liked" the selected Pick list is displayed to the viewer in step 1418. In certain embodiments, the Picks System is implemented to allow the viewer to "click through" a listed viewer to access that the viewer's associated Pick Lists, Pick Collages, and Picks user profile. After the viewer has completed viewing the viewers that "liked" the Pick Collage, or if it was determined in step 1416 not to view users that "liked" the Pick Collage, a determination is made in step 1420 whether the viewer wishes to "like" the Pick Collage. If so, then the viewer performs a user gesture in step 1422 to mark the Pick Collage as a Pick Collage they "liked."

After the viewer has marked the Pick Collage in step 1422 as a Pick Collage they "liked," or if it was determined in step 1420 not to mark the selected Pick Collage as a Pick Collage they "liked," a determination is made in step 1424 whether the viewer wishes to "share" the Pick Collage to a social media site. If so, then the viewer performs social media "sharing" operations familiar to those of skill in the art in step 1426 to "share" the Pick Collage to one or more social media sites (e.g., Facebook®, Twitter® or Pinterest®, etc.). In certain embodiments, social media control buttons are implemented to facilitate the viewer in "sharing" the Pick Collage to one or more social media sites. In various embodiments, a Picks Detail Page, described in greater detail herein, is displayed to the viewer. In these embodiments, the viewer performs social media "sharing" operations familiar to those of skill in the art in step 1426 to "share" the Picks Detail Page to one or more social media sites. In certain embodiments, social media control buttons are implemented to facilitate the viewer in "sharing" the Pick Details Page to one or more social media sites.

After the viewer has performed Pick Collage social media "sharing" operations in step 1426, or if it was determined in step 1424 not to "share" the selected Pick Collage to one or more social media sites, a determination is made in step 1428 whether the viewer wishes to view other Pick Collages associated with the creator of the currently selected Pick Collage. If so, then the viewer views other Pick Collages associated with creator of the currently selected Pick Collage in step 1430. After the viewer has viewed other Pick Collages associated with the creator of the currently selected Pick Collage step 1430, or if it was determined in step 1428 not to view other Pick Collages associated with the creator of the currently selected Pick Collage, a determination is made in step 1432 whether the viewer wishes to add one or more products in the selected Pick Collage to their shopping cart.

If it was determined in step 1432 that the viewer did not wish to add one or more products in the Pick Collage to their shopping cart, then a determination is made in step 1448 whether to end Pick Collage viewing operations. If not, then the process is continued, proceeding with step 1406. However, if it was determined in step 1432 to add one or more products in the selected Pick Collage, then a determination is made in step 1434 whether the viewer wishes to add all of the products in the selected Pick Collage to their shopping cart. If so, then they are added in step 1436. However, if it was determined in step 1434 that the viewer does not wish to add all of the products in the selected Pick Collage to their shopping cart, then a product in the Pick Collage is selected in step 1438, followed by a determination being made in step 1440 whether the selected product has any selectable attributes. If so, then the viewer selects the desired product attributes in step 1442 and the selected product is added to the shopping cart in step 1444, followed by a determination being made in step 1446 whether the viewer wishes to select another product. If so, the process is continued, proceeding with step 1438.

Otherwise, or once all products in the selected Pick Collage are added to the viewer's shopping cart in step 1436, or if it was determined in step 1432 not to add one or more products to the viewer's shopping cart, then the process is continued, proceeding with step 1448. However, if it is determined in step 1448 to end Pick Collage viewing operations, then a determination is then made in step 1450 whether there are products in the viewer's shopping cart. If so, then shopping cart checkout operations familiar to those of skill in the art are performed in step 1452. Thereafter, or if it was determined in step 1450 that there are no products in the viewer's shopping cart, then the process is continued, proceeding with step 1454.

Figure 15A:
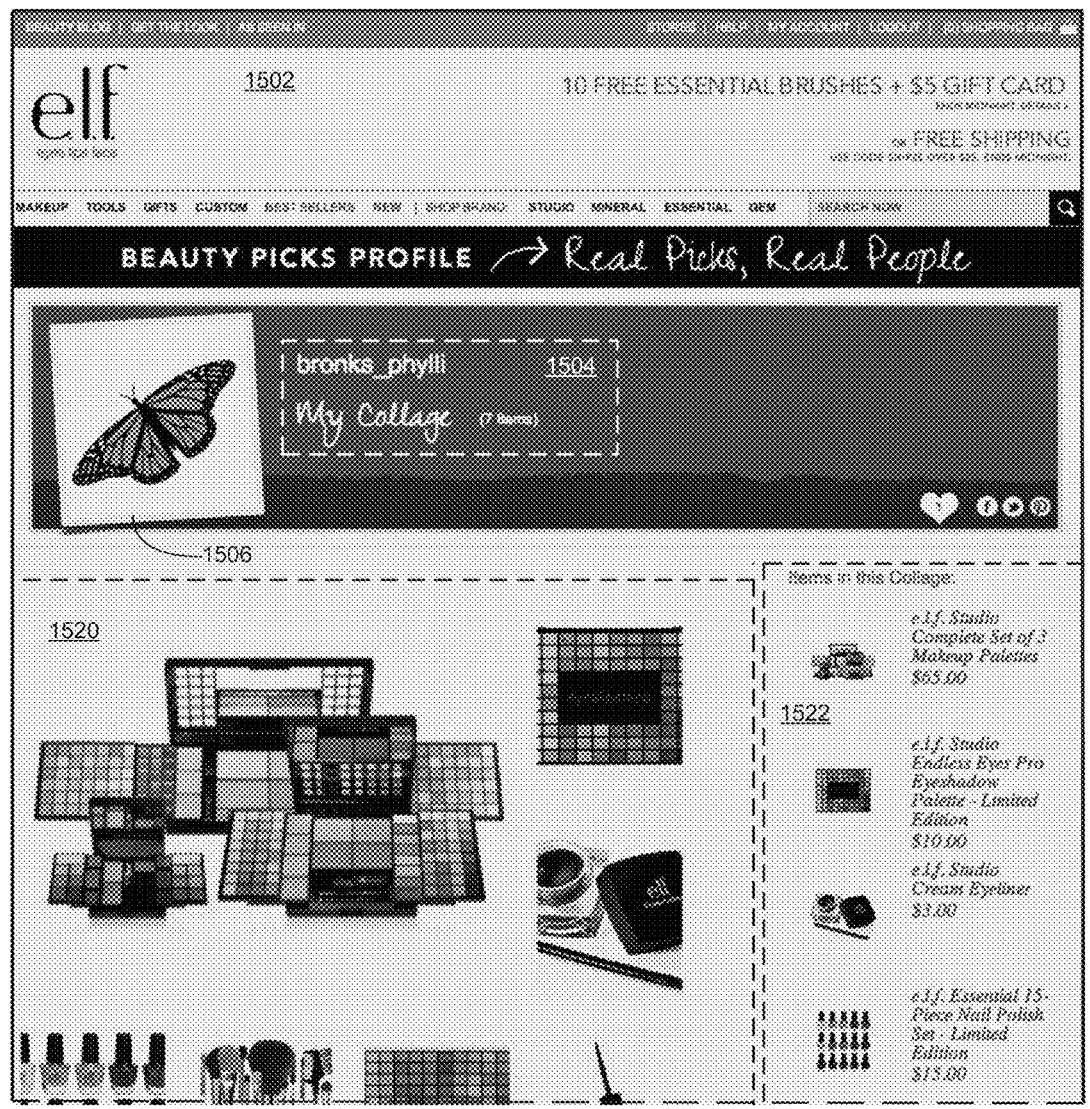
FIGS. 15a and 15b show the display of an individual Pick Collage within a Pick Collage Details UI window.
Figure 15B:
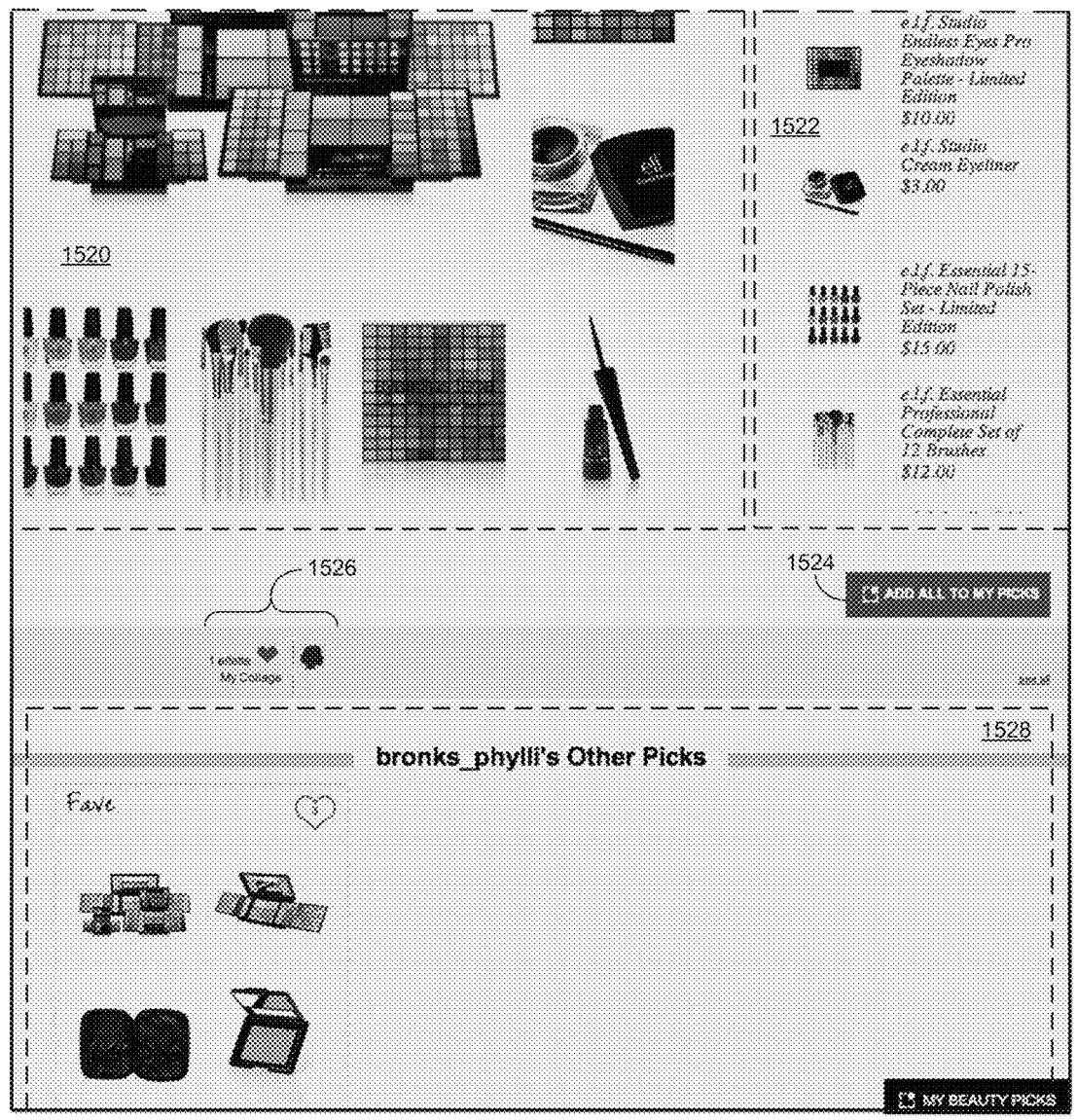

FIGS. 15*a* and 15*b* show the display of an individual Pick Collage within a Pick Collage Details user interface (UI) window implemented in accordance with an embodiment of the invention. In this embodiment, the Pick Collage Details UI window 1502 includes certain Picks user profile information associated with the Pick System user, such as their Picks screen name 1504 and Picks avatar 1506. The Pick Collage Details UI window 1302 also includes a Pick Collage summary sub-window 1520 and a Pick Collage product details sub-window 1522. As shown in FIGS. 15*a* and 15*b*, the Pick Collage summary sub-window 1520 includes a Pick Collage composite image as well as thumbnail images of the individual products included in the Pick Collage. Likewise, the Pick Collage product details sub-window 1522 includes thumbnail images of the individual products, as well as their corresponding product details.

In one embodiment, the Pick Collage Details UI window 1502 also includes an "Add All to My Picks" command button 1524, which allows the individual products displayed within the Pick Collage product details sub-window 1522 to be added to a viewer's Pick List when it is selected. In one embodiment, the number of viewers 1526 that "like" the Pick Collage are displayed within the Pick Collage Details UI window 1502. In one embodiment, other individual products 1528 that are associated with a Pick List created by the creator of the Pick Collage are displayed within the Pick Collage Details UI window 1502.

Figure 16A:
FIGS. 16a and 16b show the display of a plurality of Pick Lists and Pick Collages within a Product Details UI window.
Figure 16B:
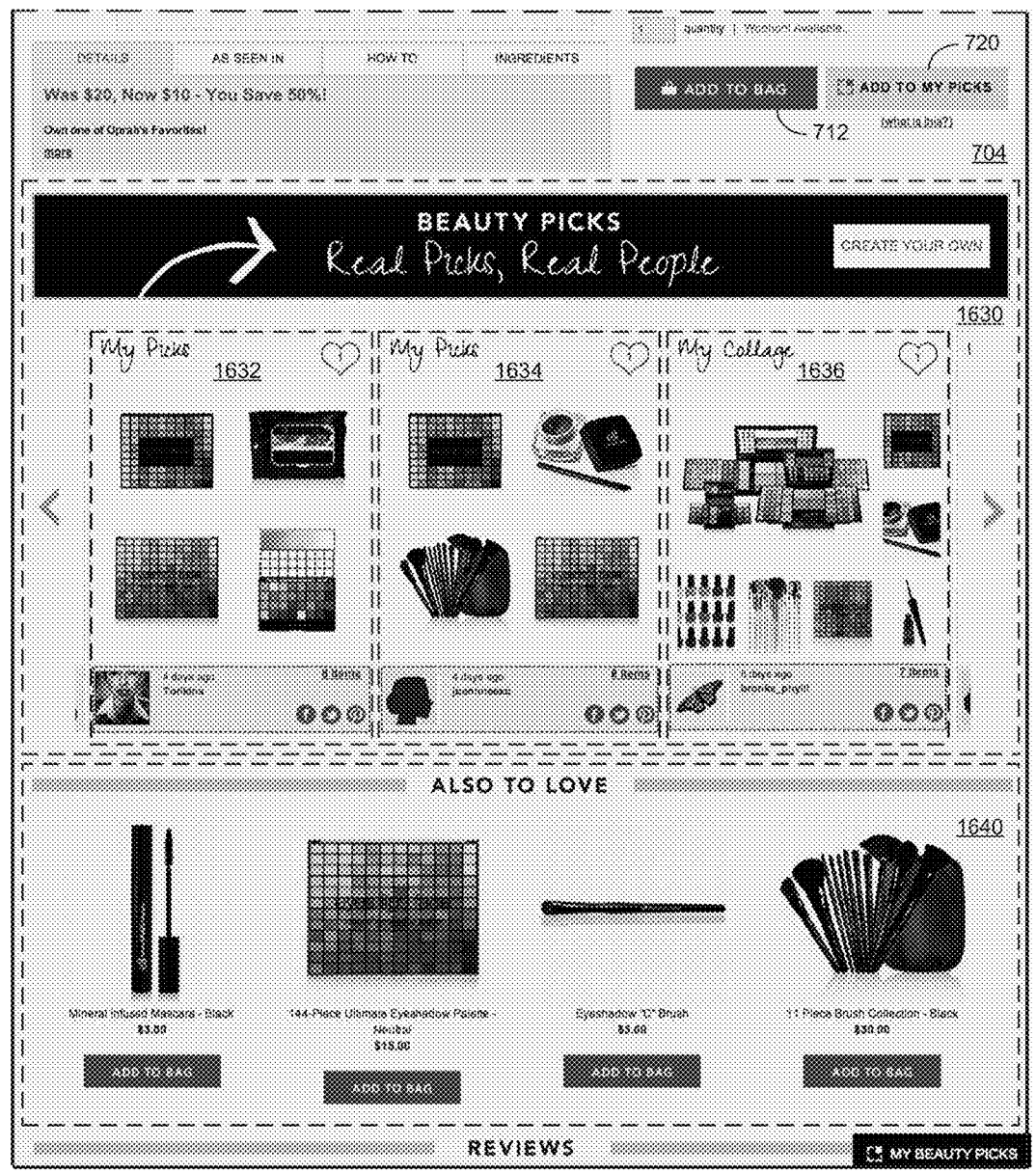

FIGS. 16*a* and 16*b* show the display of a plurality of Pick Lists and Pick Collages within a product details user interface (UI) window implemented in accordance with an embodiment of the invention. In this embodiment, a product details UI window 702 includes a Pick List and Pick Collage sub-window 1630 which is implemented to display a plurality of Pick Lists 1632, 1634 and Pick Collages 1636. As shown in FIG. 7*b*, the product details UI window 702 also includes a recommendation sub-window 1640 that is implemented to display recommended products that related to products contained in the of Pick Lists 1632, 1634 and Pick Collages 1636 displayed within the Pick List and Pick Collage sub-window 1630.

Figure 17:
FIG. 17 shows the display of Pick Collage product details within a UI window.

FIG. 17 shows the display of Pick Collage product details within a user interface (UI) window implemented in accordance with an embodiment of the invention. In this embodiment, a Pick Collage Order UI window 1702 includes certain Picks user profile information associated with the Pick System user, such as their Picks screen name 1704. The Pick Collage Details UI window 1302 also includes a plurality of Pick Collage thumbnail images 1706 that are implemented to be selected through a user gesture, such as a mouse-click with a cursor. Once selected, an image 1730 of the Pick Collage is displayed, along with details 1732 of the products included in the Pick Collage.

As shown in FIG. 17, a modal shopping sub-window 1710 is implemented in one embodiment to allow a viewer of the Pick Collage to select a quantity. Once selected, the products included in the Pick Collage can then be added to the viewer's shopping cart by selecting the "Add to Bag" command button 1712. In one embodiment, the Pick Collage can likewise be added to the viewer's collection of Pick Lists and Pick Collages by selecting the "add to My Picks" command button 1720 with a user gesture.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automating provision of social media product recommendations in an electronic commerce environment, the electronic commerce environment comprising a cloud computing environment executing a Pick System and a merchant system communicating with the Pick System, comprising:
    receiving product selection data from a user, the product selection data corresponding to a product provided by a merchant;
    receiving user input data from a user, the user input data comprising a request to generate a Pick Collage to be displayed on a web page of a website associated with the merchant, the website executing on the merchant system;
    processing the product selection data and the user input data to generate the Pick Collage, the Pick Collage corresponding to a set of products selected from a Pick List, the Pick Collage comprising content cached in and served from a content delivery network associated with the Pick System, the content delivery network storing product images, Pick Collage images, consolidated Picks Javascript and merchant product images within a Picks database, the Picks database storing large data sets within a plurality of database shards, each of the plurality of database shards corresponding to an individual partition within the Picks database;
    providing the Pick Collage to the website for display on the web page, the Pick Collage comprising pictorially arranged representations of products based upon the product selection data from the user; and,
    displaying the Pick Collage within a user interface, the displaying being presented via a display associated with a computer system and automating provision of social media product recommendations via the computer system; and wherein
    the receiving product selection data, receiving user input, and displaying the Pick Collage executing on the merchant system;
    the processing the product selection data and providing the Pick Collage being performed by the Pick System executing on the cloud computing environment; and,
    the Pick System accessing the website associated with the merchant to obtain the product selection data.

2. The computer-implementable method of claim 1, further comprising:
    receiving template selection data from the user, the template selection data corresponding to the selection of a Pick Collage template; and
    using the Pick Collage template to generate the Pick Collage.

3. The computer-implementable method of claim 2, wherein:
    the Pick Collage is displayed on the web page subsequent to its receipt by the website.

4. The computer-implementable method of claim 2, wherein:
    the product selection data corresponds to a product that is a member of a Pick List associated with the user.

5. The computer-implementable method of claim 2, wherein:
    the Pick Collage template comprises predetermined Pick Collage design parameters.

6. The computer-implementable method of claim 5, wherein the Pick Collage design parameters comprises at least one member of the set of:
    a visual layout;
    a background image;
    a color palette; and
    a typeface.

7. The computer-implementable method of claim 2, further comprising:
    receiving editing data from a user, the editing data comprising Pick Collage editing instructions; and
    processing the editing data to edit the Pick Collage.

8. The computer-implementable method of claim 2, further comprising:
    receiving naming data from a user, the naming data comprising Pick Collage naming instructions; and
    processing the naming data to assign a name to the Pick Collage.

9. The computer-implementable method of claim 1, wherein:
    the Pick Collage is provided to the website from a server at a remote location.

10. The computer-implementable method of claim 1, wherein:
    the Pick Collage is provided to the website by a service provider on an on-demand basis.

11. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
  receiving product selection data from a user, the product selection data corresponding to a product provided by a merchant;
  receiving user input data from a user, the user input data comprising a request to generate a Pick Collage to be displayed on a web page of a website associated with the merchant;
  processing the product selection data and the user input data to generate the Pick Collage, the Pick Collage corresponding to a set of products selected from a Pick List, the Pick Collage comprising content cached in and served from a content delivery network, the content delivery network storing product images, Pick Collage images, consolidated Picks Javascript and merchant product images within a Picks database, the Picks database storing large data sets within a plurality of database shards, each of the plurality of database shards corresponding to an individual partition within the Picks database;
  providing the Pick Collage to the website;
  displaying the Pick Collage on the web page, the Pick Collage comprising pictorially arranged representations of products based upon the product selection data from the user; and,
  displaying the Pick Collage within a user interface, the displaying being presented via a display associated with a computer system and automating provision of social media product recommendations via the computer system; and wherein
  the receiving product selection data, receiving user input, and displaying the Pick Collage executing on the merchant system;
  the processing the product selection data and providing the Pick Collage being performed by the Pick System executing on the cloud computing environment; and,
  the Pick System accessing the web site associated with the merchant to obtain the product selection data.

12. The system of claim 1, further comprising:
receiving template selection data from the user, the template selection data corresponding to the selection of a Pick Collage template; and
using the Pick Collage template to generate the Pick Collage.

13. The system of claim 12, wherein:
the Pick Collage is displayed on the web page subsequent to its receipt by the website.

14. The system of claim 12, wherein:
the product selection data corresponds to a product that is a member of a Pick List associated with the user.

15. The system of claim 12, wherein:
the Pick Collage template comprises predetermined Pick Collage design parameters.

16. The system of claim 11, wherein the Pick Collage design parameters comprises at least one member of the set of:
a visual layout;
a background image;
a color palette; and
a typeface.

17. The system of claim 12, further comprising:
receiving editing data from a user, the editing data comprising Pick Collage editing instructions; and
processing the editing data to edit the Pick Collage.

18. The system of claim 12, further comprising:
receiving naming data from a user, the naming data comprising Pick Collage naming instructions; and
processing the naming data to assign a name to the Pick Collage.

19. The system of claim 11, wherein:
the Pick Collage is provided to the website from a server at a remote location.

20. The system of claim 11, wherein:
the Pick Collage is provided to the website by a service provider on an on-demand basis.

* * * * *